United States Patent
Ito

(10) Patent No.: US 10,135,152 B2
(45) Date of Patent: Nov. 20, 2018

(54) ANTENNA DEVICE AND ELECTRONIC DEVICE

(71) Applicant: Murata Manufacturing Co., Ltd., Nagaokakyo-shi, Kyoto-fu (JP)

(72) Inventor: Hiromitsu Ito, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/652,286

(22) Filed: Jul. 18, 2017

(65) Prior Publication Data

US 2017/0317425 A1   Nov. 2, 2017

Related U.S. Application Data

(63) Continuation of application No. PCT/JP2016/069837, filed on Jul. 5, 2016.

(30) Foreign Application Priority Data

Jul. 6, 2015 (JP) .................... 2015-135044

(51) Int. Cl.
*H01Q 19/00* (2006.01)
*G06K 19/077* (2006.01)
(Continued)

(52) U.S. Cl.
CPC .......... *H01Q 19/00* (2013.01); *G06K 19/077* (2013.01); *H01Q 7/00* (2013.01); *H01Q 5/378* (2015.01); *H01Q 13/106* (2013.01); *H01Q 21/28* (2013.01)

(58) Field of Classification Search
CPC .......... H01Q 19/00; H01Q 7/00; H01Q 5/378; H01Q 13/106; H01Q 21/28
(Continued)

(56) References Cited

U.S. PATENT DOCUMENTS

2013/0307746 A1* 11/2013 Nakano ............... H01Q 1/2225
343/850
2015/0116168 A1*  4/2015 Yosui ..................... H01Q 7/00
343/722
2015/0123858 A1   5/2015 Kato

FOREIGN PATENT DOCUMENTS

JP   2014-027389 A   2/2014
JP   2014-075775 A   4/2014
(Continued)

OTHER PUBLICATIONS

Official Communication issued in International Patent Application No. PCT/JP2016/069837, dated Sep. 20, 2016.
(Continued)

*Primary Examiner* — Andrea Lindgren Baltzell
(74) *Attorney, Agent, or Firm* — Keating & Bennett, LLP

(57) ABSTRACT

An antenna device includes a power supply coil coupled to a first power supply circuit operating in a first frequency band, a first conductive member including a first main surface, a second conductive member including a second main surface, a third conductive member, and first connections. The second main surface of the second conductive member is disposed with at least a portion thereof opposing the first main surface. The third conductive member has an area that is smaller than an area of the first conductive member when viewed in a direction perpendicular or substantially perpendicular to the first main surface. The first conductive member, the third conductive member, and the first connections define a loop of a magnetic field antenna in the first frequency band. The power supply coil is closer to the third conductive member than to the first conductive member when viewed in the Z-direction.

10 Claims, 22 Drawing Sheets

(51) Int. Cl.
*H01Q 7/00* (2006.01)
*H01Q 13/10* (2006.01)
*H01Q 21/28* (2006.01)
*H01Q 5/378* (2015.01)

(58) Field of Classification Search
USPC .......................................................... 343/870
See application file for complete search history.

(56) References Cited

FOREIGN PATENT DOCUMENTS

| | | |
|---|---|---|
| JP | 2014-239539 A | 12/2014 |
| JP | 2015-092775 A | 5/2015 |

OTHER PUBLICATIONS

Official Communication issued in corresponding Japanese Patent Application No. 2017-130067, dated Jul. 17, 2018.

\* cited by examiner

ANTENNA DEVICE AND ELECTRONIC DEVICE

CROSS REFERENCE TO RELATED APPLICATIONS

This application claims the benefit of priority to Japanese Patent Application No. 2015-135044 filed on Jul. 6, 2015 and is a Continuation Application of PCT Application No. PCT/JP2016/069837 filed on Jul. 5, 2016. The entire contents of each application are hereby incorporated herein by reference.

BACKGROUND OF THE INVENTION

1. Field of the Invention

The present invention relates to an antenna device and, in particular, relates to an antenna device that includes a loop (a booster antenna) and that significantly reduces or prevents a decrease in function of the booster antenna. Furthermore, the present invention relates to an electronic device that includes the antenna device.

2. Description of the Related Art

In recent years, an antenna device has been put to practical use in which the antenna device includes a booster antenna and has electrical characteristics that are, while using a small-sized antenna coil, similar to those of a large antenna coil.

For example, Japanese Unexamined Patent Application Publication No. 2014-075775 discloses an antenna device including two planar conductors, two capacitors, and a power supply coil, in which a slit is formed at a portion where the planar conductors are adjacent to each other. The two capacitors described above are each coupled to edges of the slit, and the two planar conductors and the two capacitors are connected in series and define a loop. A coil opening of the power supply coil is disposed in the vicinity of the slit and the power supply coil is coupled to the loop. With the above-described configuration, the loop functions as a booster antenna for the power supply coil.

However, in the configuration described in Japanese Unexamined Patent Application Publication No. 2014-075775, there are cases in which the coupling coefficient between the loop and the power supply coil change due to the positional relationship between the loop and the power supply coil. Accordingly, there is a concern that, depending on the disposition of the power supply coil, the power supply coil may not sufficiently be coupled to the loop, resulting in a decrease in communication characteristics of the antenna device.

SUMMARY OF THE INVENTION

Preferred embodiments of the present invention provide reduced size antenna devices that, by significantly reducing or preventing a decrease in the function of the booster antenna, significantly reduce or prevent a decrease in communication characteristics. Furthermore, preferred embodiments of the present invention provide electronic devices including such antenna devices.

An antenna device according to a preferred embodiment of the present invention includes a power supply coil including a coil-shaped conductor, the power supply coil being coupled to a first power supply circuit that operates in a first frequency band, a first conductive member including a first main surface, a second conductive member including a second main surface disposed with at least a portion thereof opposing the first main surface, a third conductive member that has an area that is smaller than an area of the first conductive member when viewed in a direction perpendicular or substantially perpendicular to the first main surface, and a plurality of first connections that couple the first conductive member and the third conductive member to each other, in which the first conductive member and the third conductive member do not overlap each other when viewed in the direction perpendicular or substantially perpendicular to the first main surface, in which the first conductive member, the third conductive member, and the plurality of first connections define at least a portion of a loop of a magnetic field antenna in the first frequency band, and in which the power supply coil is disposed between a plane including the first main surface and a plane including the second main surface and closer to the third conductive member than to the first conductive member, and is disposed in an orientation interlinking a magnetic flux passing through the power supply coil and the loop to each other.

An antenna device according to a preferred embodiment of the present invention includes a power supply coil including a coil-shaped conductor, the power supply coil being coupled to a power supply circuit that operates in a first frequency band, a first conductive member including a first main surface, a second conductive member including a second main surface disposed with at least a portion thereof opposing the first main surface, a third conductive member that has an area that is smaller than an area of the first conductive member when viewed in a direction perpendicular or substantially perpendicular to the first main surface, and a plurality of second connections that couple the second conductive member and the third conductive member to each other, in which the first conductive member and the third conductive member do not overlap each other when viewed in the direction perpendicular or substantially perpendicular to the first main surface, in which the second conductive member, the third conductive member, and the second connections define at least a portion of a loop of a magnetic field antenna in the first frequency band, and in which the power supply coil is disposed between a plane including the first main surface and a plane including the second main surface and closer to the third conductive member than to the first conductive member, and is disposed in an orientation interlinking a magnetic flux passing through the power supply coil and the loop to each other.

In the above configurations, in the HF (high frequency) band (the first frequency band), the power supply coil is magnetically coupled or electromagnetically coupled to the loop, and the loop defines and functions as a booster antenna for the power supply coil. Accordingly, compared with a case in which only the power supply coil is included, the effective coil opening that defines and functions as an antenna is larger, and the range and distance in which the magnetic flux radiates (collects) is larger and coupling to an antenna coil of a communication partner is facilitated. Accordingly, an antenna device with excellent communication characteristics is able to be provided with a simple configuration and without using a large antenna coil.

Furthermore, in the above configurations, the power supply coil is closer to the second conductive member than to the first conductive member. Accordingly, in a case in which a magnetic flux (a magnetic flux that does not contribute to the coupling between the loop and the power supply coil) that defines a large loop and that does not interlink with the loop opening is generated, an eddy current is generated in the second conductive member and the magnetic flux is cancelled out or substantially cancelled out. Accordingly, since formation of a magnetic flux that does not interlink with the loop opening is significantly reduced or prevented and a magnetic flux that does not contribute to the coupling between the loop and the power supply coil is significantly reduced or prevented, the coupling coefficient between the loop and the power supply coil is significantly increased.

Preferably, the plurality of first connections includes at least one reactance element, for example. With the above configuration, since the plurality of first connections are provided by reactance elements, the loop is able to be easily configured as an LC resonant circuit in the HF band.

Preferably, the second connections include at least one reactance element, for example. With the above configuration, since the second connections are provided by reactance elements, the loop is able to be easily configured as an LC resonant circuit in the HF band.

Preferably, at least a portion of the second main surface of the second conductive member overlaps the third conductive member when viewed in the direction perpendicular or substantially perpendicular to the first main surface, for example. With the above configuration, in a case in which a magnetic flux that does not interlink with the loop opening is generated, an eddy current is generated in the second conductive member and the magnetic flux is cancelled out or substantially cancelled out. Furthermore, when viewed in a thickness direction (a Z-direction), as the area in which the second main surface of the second conductive member overlaps the third conductive member becomes larger, formation of a magnetic flux that does not interlink with the loop opening is further significantly reduced or prevented and, the coupling coefficient between the loop and the power supply coil is significantly increased.

Preferably, an entirety of the power supply coil overlaps the third conductive member when viewed in the direction perpendicular or substantially perpendicular to the first main surface, for example. With the above configuration, since the coupling coefficient between the loop and the power supply coil is high, the distance at which the magnetic flux is radiated (collected) with the loop becomes large and coupling to the antenna coil of the communication partner becomes easier. Accordingly, as a result, an antenna device with excellent communication characteristics is able to be provided.

Preferably, the third conductive member is coupled to a second power supply circuit that operates in a second frequency band higher than the first frequency band, the third conductive member being a radiation element of a standing wave antenna in the second frequency band, for example. With the above configuration, the loop of the magnetic field antenna defines and functions as the antenna operating in the first frequency band, and the radiation element of the standing wave antenna defines and functions as an antenna operating in the second frequency band. Accordingly, an antenna device that includes a loop of the magnetic field antenna and a radiation element of a standing wave antenna, and that is able to be included in a plurality of systems operating in different frequency bands is able to be provided.

Preferably, the second conductive member is a ground conductor, for example. With the above configuration, since the ground conductor of the circuit substrate or the like is included as a portion of the loop, a loop defining and functioning as a magnetic field antenna is able to be easily defined. Accordingly, a conductor that defines a portion of the loop does not have to be formed separately, and manufacturing is facilitated and a cost is significantly reduced.

An electronic device according to a preferred embodiment of the present invention includes an antenna device, and a housing, in which the antenna device includes a power supply coil including a coil-shaped conductor, the power supply coil being coupled to a power supply circuit that operates in a first frequency band, a first conductive member including a first main surface, a second conductive member including a second main surface disposed with at least a portion thereof opposing the first main surface, a third conductive member that has an area that is smaller than an area of the first conductive member when viewed in a direction perpendicular or substantially perpendicular to the first main surface, and a plurality of first connections that couple the first conductive member and the third conductive member to each other, in which the first conductive member and the third conductive member do not overlap each other when viewed in the direction perpendicular or substantially perpendicular to the first main surface, in which the first conductive member, the third conductive member, and the plurality of first connections define at least a portion of a loop of a magnetic field antenna in the first frequency band, and in which the power supply coil is disposed between a plane including the first main surface and a plane including the second main surface and closer to the third conductive member than to the first conductive member, and is disposed in an orientation interlinking a magnetic flux passing through the power supply coil and the loop to each other.

An electronic device according to a preferred embodiment of the present invention includes an antenna device, and a housing, in which the antenna device includes a power supply coil including a coil-shaped conductor, the power supply coil being coupled to a power supply circuit that operates in a first frequency band, a first conductive member including a first main surface, a second conductive member including a second main surface disposed with at least a portion thereof opposing the first main surface, a third conductive member that has an area that is smaller than an area of the first conductive member when viewed in a direction perpendicular or substantially perpendicular to the first main surface, and a plurality of second connections that couple the second conductive member and the third conductive member to each other, in which the first conductive member and the third conductive member do not overlap each other when viewed in the direction perpendicular or substantially perpendicular to the first main surface, in which the second conductive member, the third conductive member, and the second connections define at least a portion of a loop of a magnetic field antenna in the first frequency band, and in which the power supply coil is disposed between a plane including the first main surface and a plane including the second main surface and closer to the third conductive member than to the first conductive member, and is disposed in an orientation interlinking a magnetic flux passing through the power supply coil and the loop to each other.

In some of the configurations described above, in the HF band (the first frequency band), the power supply coil is magnetically coupled or electromagnetically coupled to the loop, and the loop defines and functions as a booster antenna for the power supply coil. Accordingly, compared with a case in which only the power supply coil is included, the effective coil opening that defines and functions as an antenna is larger, and the range and distance in which the magnetic flux radiates (collects) is larger and coupling to an antenna coil of a communication partner is facilitated.

Accordingly, an electronic device including the antenna device with excellent communication characteristics is able to be provided with a simple configuration and without using a large antenna coil.

Furthermore, in the above configurations, the power supply coil is closer to the second conductive member than to the first conductive member. Accordingly, in a case in which a magnetic flux (a magnetic flux that does not contribute to the coupling between the loop and the power supply coil) that defines a large loop and that does not interlink with the loop opening is generated, an eddy current is generated in the second conductive member and the magnetic flux is cancelled out or substantially cancelled out. Accordingly, since formation of a magnetic flux that does not interlink with the loop opening is significantly reduced or prevented and a magnetic flux that does not contribute to the coupling between the loop and the power supply coil is significantly reduced or prevented, the coupling coefficient between the loop and the power supply coil is significantly increased.

Preferably, at least one of the plurality of first connections is a portion of the housing, for example. With the above configuration, the first connections that are a portion of the loop are able to be provided easily by the housing. Accordingly, the first connection does not have to be formed separately, and manufacturing is facilitated and a cost is significantly reduced.

Preferably, at least one of the second connections is a portion of the housing, for example. With the above configuration, the second connections that are a portion of the loop are able to be provided easily by the housing. Accordingly, the second connection does not have to be formed separately, and manufacturing is facilitated and a cost is significantly reduced.

Preferably, the first conductive member is a portion of the housing, for example. With the above configuration, the first conductive member is able to be provided easily by the housing. Accordingly, since the first conductive member does not have to be formed separately, the electronic device itself is able to be made small in size, is able to be manufactured easily, and a cost thereof is able to be significantly reduced.

Preferably, the second conductive member is a portion of the housing, for example. With the above configuration, the second conductive member is able to be provided easily by the housing. Accordingly, since the second conductive member does not have to be formed separately, the electronic device itself is able to be made small in size, is able to be manufactured easily, and a cost thereof is able to be significantly reduced.

Preferably, the third conductive member is a portion of the housing, for example. With the above configuration, the third conductive member that is a portion of the loop is able to be provided easily by the housing. Accordingly, since the third conductive member does not have to be formed separately, the electronic device itself is able to be made small in size, is able to be manufactured easily, and a cost thereof is able to be significantly reduced.

Preferred embodiments of the present invention are able to provide small-sized antenna devices that, by significantly reducing or preventing a decrease in an operation of a booster antenna, significantly reduces or prevents a decrease in communication characteristics. Furthermore, an electronic device including the antenna device is able to be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
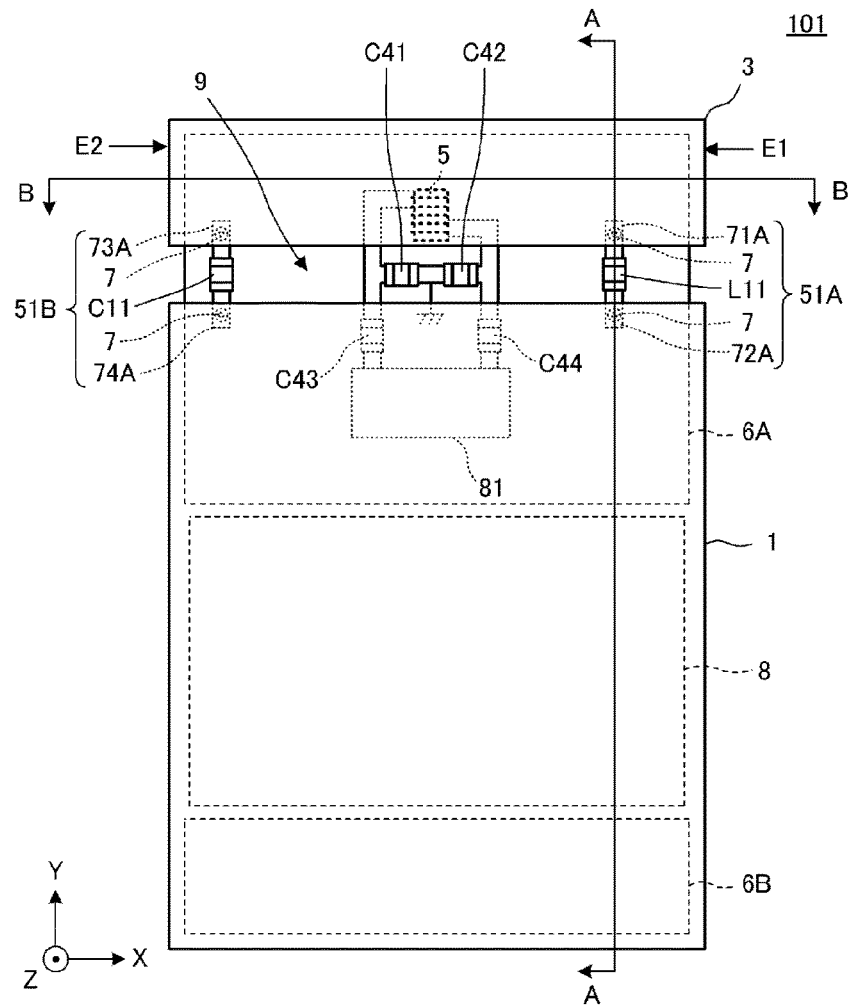
FIG. 1A is a plan view of an antenna device according to a first preferred embodiment of the present invention.

Hereinafter, referring to the drawings, a plurality of preferred embodiments of the present invention will be described by way of specific examples. In each of the drawings, portions that are the same or substantially the same are designated with the same reference numerals. With the consideration to facilitate description of the main points and to facilitate understanding, a plurality of separate preferred embodiments will be described. However, the components shown in each of the different preferred embodiments may be partially replaced or may be combined. Description of features and elements of the second and further preferred embodiments of the present invention that are common to those of the first preferred embodiment of the present invention will be omitted and only points that are different will be described. Particularly, similar features and advantages provided by similar configurations will not be described one by one in each of the preferred embodiments.

In each preferred embodiment of the present invention described hereinafter, a "magnetic field antenna" is a type of minute loop antenna, and is an antenna that radiates a magnetic flux, for example.

A magnetic field antenna is an antenna that is used in communications such as, for example, a near field communication (NFC) established with an antenna of a communication partner through magnetic field coupling. The frequency band at which the magnetic field antenna operates is an HF (high frequency) band, for example, and, particularly, the magnetic field antenna at a frequency of about 13.56 MHz, for example. The size of the magnetic field antenna is extremely small compared with the wave length λ of the frequency, and the radiation characteristics of the electromagnetic wave in the frequency band are poor. In a stretched state, the length of a coil-shaped conductor of a power supply coil included in an antenna device described later is about λ/10 or shorter, for example. The term "wave length" used herein denotes an effective wave length in which the wavelength shortening effect produced by the dielectricity and the permeability of the base material with which the antenna is formed has been taken into consideration. Both ends of the coil-shaped conductor included in the power supply coil are coupled to a power circuit that controls the frequency band (for example, the HF band, about 13.56 MHz in particular). A uniform or substantially uniform amount of electric current flows through the coil-shaped conductor in a direction extending along the coil-shaped conductor (a direction in which the electric current flows). Accordingly, a current distribution generated when the length of the coil-shaped conductor is substantially the same or longer than the wave length is not easily generated in the coil-shaped conductor.

In each of the preferred embodiments of the present invention described hereinafter, a "standing wave antenna" denotes an antenna in which standing waves of the electric current and the voltage (potential) are generated on a radiation element. In other words, the standing wave antenna resonates and, on the radiation element, nodes and antinodes are generated in the current and the voltage (potential). For example, due to the boundary conditions of the electric current and the voltage (potential) on the radiation element, the electric current is zero or substantially zero at the end portion of the radiation element and, in a case in which the end portion of the radiation element is electrically connected to a ground, the voltage is zero or substantially zero at the connection with the ground. Examples of the standing wave antenna include a dipole antenna, a monopole antenna, an inverted-L antenna, an inverted-F antenna (IFA), a one-wavelength loop antenna, a folded dipole antenna, a folded monopole antenna, a microstrip antenna, a patch antenna, a planar inverted-F antenna (PIFA), a slot antenna, a notch antenna, and an modified antenna of each of the above antennas (for example, a parallel connection of a plurality of the radiation elements, a plurality of stubs being provided, and the shapes of the radiation elements being changed depending on the location of the stubs).

The standing wave antenna is used in far field communication, that is, communication established with an antenna of the communication partner through an electromagnetic wave (a radio wave). For example, the standing wave antenna is used for telephone calls and data communication in cellular phone terminals, for wireless LAN communication, and to receive satellite signals in GPS.

An "electronic device" according to preferred embodiments of the present invention is a device that includes a housing and the magnetic field antenna described above, or a device that includes a housing, the magnetic field antenna described above, and a standing wave antenna. For example, the electronic device is included in a cellular phone terminal, a smartphone, a tablet terminal, a note PC, a wearable terminal (for example, a smartwatch, smart glasses, or the like), or a similar device or terminal.

First Preferred Embodiment

Figure 1B:
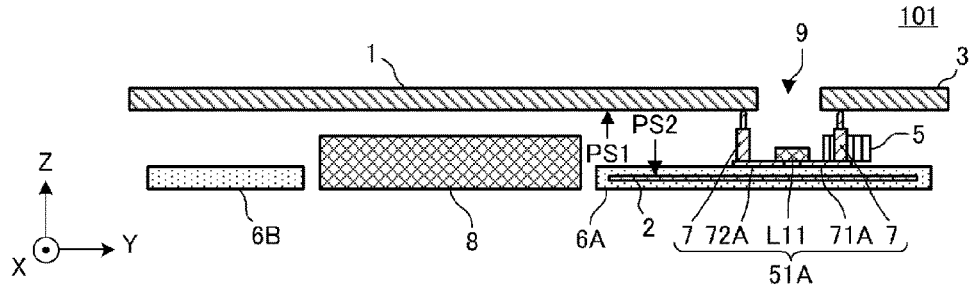
FIG. 1B is a cross-sectional view taken along line A-A in FIG. 1A.
Figure 1C:
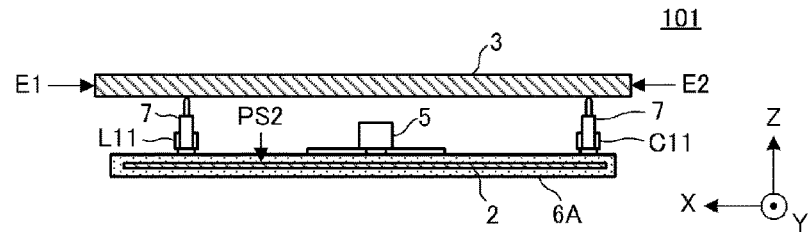
FIG. 1C is a cross-sectional view taken along line B-B in FIG. 1A.

FIG. 1A is a plan view of an antenna device 101 according to a first preferred embodiment of the present invention, FIG. 1B is a cross-sectional view taken along line A-A in FIG. 1A, and FIG. 1C is a cross-sectional view taken along line B-B in FIG. 1A. In FIGS. 1B and 1C, each portion is shown with an exaggerated thickness. The cross-sectional views of the other preferred embodiments are also shown with an exaggerated thickness.

Figure 2:
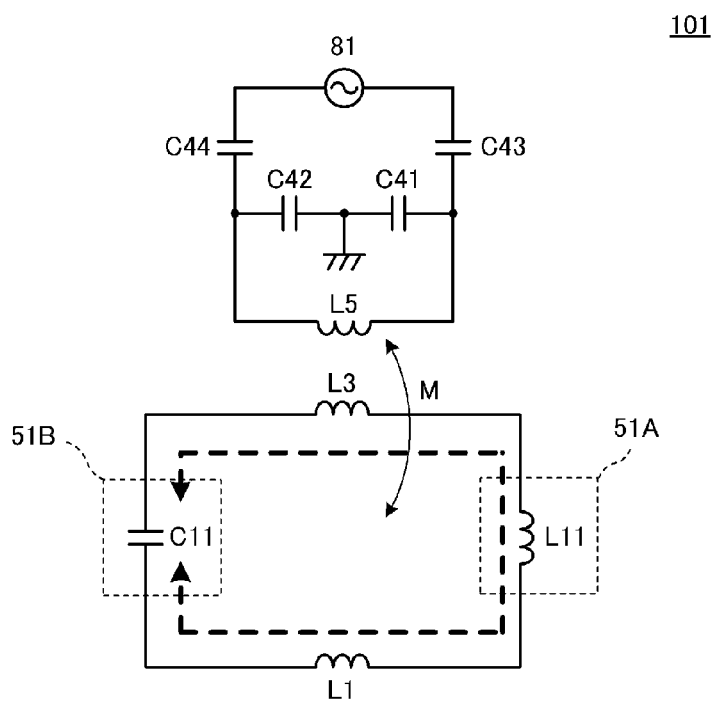
FIG. 2 is an equivalent circuit diagram of lumped elements in the antenna device shown in FIGS. 1A to 1C.

FIG. 2 is an equivalent circuit diagram of lumped elements in the antenna device 101. In FIG. 2, an inductor L1 corresponds to a first conductive member 1, an inductor L3 corresponds to a third conductive member 3, and an inductor L5 corresponds to a power supply coil 5. The equivalent circuit diagrams in the other preferred embodiments depict the same or similar elements.

The antenna device 101 includes the first conductive member 1, the third conductive member 3, substrates 6A and 6B, a battery pack 8, first connections 51A and 51B, a first power supply circuit 81, the power supply coil 5, and capacitors C41, C42, C43, and C44.

The first conductive member 1 is a rectangular flat or substantially rectangular flat plate, and includes a first main surface PS1 (a surface on the lower side of the first conductive member 1 in FIG. 1B). The longitudinal direction of the first conductive member 1 coincides with the lengthwise direction (a Y-direction in FIG. 1A).

The third conductive member 3 is a rectangular flat or substantially rectangular flat plate. The longitudinal direction of the third conductive member 3 coincides with the crosswise direction (an X-direction in FIG. 1A), and the third conductive member 3 includes a first end portion E1 and a second end portion E2. As shown in FIG. 1A, when viewed from a direction perpendicular or substantially perpendicular to the first main surface (a Z-direction in FIG. 1A, hereinafter, referred to as a "thickness direction"), an area of the third conductive member 3 is smaller than an area of the first conductive member 1.

The first conductive member 1 and the third conductive member 3 according to the present preferred embodiment are arranged in the lengthwise direction (the Y-direction) and are disposed on the same or substantially the same plane with a gap 9 in between (see FIG. 1B). Accordingly, as shown in FIG. 1A, the first conductive member 1 and the third conductive member 3 do not overlap each other when viewed in the thickness direction (Z-direction). The first conductive member 1 and the third conductive member 3 are portions of a back housing of an electronic device such as, for example, a smart phone, and are formed of metal or graphite, for example.

Substrates 6A and 6B are rectangular flat or substantially rectangular flat insulating plates. The substrates 6A and 6B are arranged in the lengthwise direction (the Y-direction in FIG. 1A) with the battery pack 8 in between and are disposed on the same or substantially the same plane (see FIG. 1B). The substrates 6A and 6B may be coupled to each other with a coaxial cable (not shown), for example.

The substrate 6A includes a tabular second conductive member 2 located therein. The second conductive member 2 is a ground conductor provided on an entire or substantially an entire main surface of the substrate 6A, and includes a second main surface PS2 (a surface on the upper side of the second conductive member 2 in FIG. 1B). As shown in FIG. 1B, the second main surface PS2 is disposed so that at least a portion thereof opposes the first main surface PS1 of the first conductive member 1. Furthermore, when viewed in the thickness direction (Z-direction), at least a portion of the second main surface PS2 overlaps the third conductive member 3.

The first connection 51A includes an inductor L11, connection conductors 71A and 72A, and contact pins 7, and is coupled between the first conductive member 1 and the third conductive member 3. Specifically, a first end of the inductor L11 is coupled adjacent to or in a vicinity of the first end portion E1 of the third conductive member 3 with the connection conductor 71A and the contact pin 7 interposed therebetween, and a second end of the inductor L11 is coupled to the first conductive member 1 with the connection conductor 72A and the contact pin 7 interposed therebetween. The inductor L11 is an inductor component such as, for example, a chip inductor, and is mounted on the main surface of the substrate 6A. The connection conductors 71A and 72A are straight or substantially straight (I-shaped) conductive patterns provided on the main surface of the substrate 6A. The contact pins 7 are moving probe pins, for example.

The first connection 51B includes a capacitor C11, connection conductors 73A and 74A, and a contact pin 7, and is coupled between the first conductive member 1 and the third conductive member 3. Specifically, a first end of the capacitor C11 is coupled adjacent to or in a vicinity of the second end portion E2 of the third conductive member 3 with the connection conductor 73A and the contact pin 7 interposed therebetween, and a second end of the capacitor C11 is coupled to the first conductive member 1 with the connection conductor 74A and the contact pin 7 interposed therebetween. The capacitor C11 is a capacitor component such as, for example, a chip capacitor, and is mounted on the main surface of the substrate 6A. The connection conductors 73A and 74A are straight or substantially straight (I-shaped) conductive patterns provided on the main surface of the substrate 6A.

As shown in FIG. 1A, the first conductive member 1, the third conductive member 3, and the first connections 51A and 51B define a loop.

The first power supply circuit 81, the power supply coil 5, and the capacitors C41 to C44 are mounted on the main surface of the substrate 6A.

The first power supply circuit 81 is a balanced input/output type HF band (a first frequency band) IC. Input/output portions of the first power supply circuit 81 are coupled to the power supply coil 5 with the capacitors C41 to C44 interposed therebetween. A series circuit of the capacitors C41 and C42 is serially coupled to the power supply coil 5, and an LC resonant circuit is defined by the power supply coil 5 and the capacitors C41 and C42. The first power supply circuit 81 feeds a communication signal in the HF band (the first frequency band) to the LC resonant circuit described above with the capacitors C43 and C44 interposed therebetween. The first power supply circuit 81 is, for example, an RFIC (radio frequency integrated circuit) element for 13.56 MHz RFID (radio frequency identification), and the power supply coil 5 is, for example, a laminated coil (a coil antenna) in which a coil-shaped conductor is provided on a magnetic ferrite core.

The power supply coil 5 described above is magnetically coupled or electromagnetically coupled (magnetically coupled and electric-field coupled) to the loop defined by the first conductive member 1, the third conductive member 3, and the first connections 51A and 51B.

Specifically, the power supply coil 5 according to the present preferred embodiment is disposed, when viewed in the thickness direction (the Z-direction), adjacent to or in a vicinity of the middle of the third conductive member 3 in the longitudinal direction, and along an edge portion of the third conductive member 3 located where a coil opening faces the gap 9. In other words, the power supply coil 5 is disposed in an orientation interlinking the magnetic flux passing through the power supply coil 5 and the loop to each other. Accordingly, the power supply coil 5 is primarily magnetically coupled to the loop (particularly, the third conductive member 3).

Furthermore, as shown in FIG. 1B, the power supply coil 5 is disposed between a plane (an XY-plane) including the first main surface PS1 of the first conductive member 1, and a plane (an XY-plane) including the second main surface PS2 of the second conductive member 2. Furthermore, when viewed in the thickness direction (the Z-direction), the entire power supply coil 5 overlaps the third conductive member, and is disposed between the second conductive member 2 and the third conductive member 3. In other words, when viewed in the thickness direction (the Z-direction), the power supply coil 5 is closer to the third conductive member 3 than to the first conductive member 1. Accordingly, the power supply coil 5 is not only magnetically coupled to the third conductive member but is also electromagnetically coupled, which includes electric-field coupling, to the third conductive member.

As shown in FIG. 2, in the HF band (the first frequency band), the loop described above defines an LC resonant circuit defined by the inductor L1, the inductor L3, the inductor L11, and the capacitor C11. As described above, the power supply coil 5 is magnetically coupled or electromagnetically coupled to the loop. The loop described above LC resonates in the HF band, and a resonance current flows at the edges of the first conductive member and the third conductive member 3. In other words, circuit constants, such as the length of the third conductive member 3 and the reactance components of the inductor L1, the inductor L3, the inductor L11, and the capacitor C11, are determined so that the loop resonates in the HF band. Accordingly, in the HF band (the first frequency band), the electric current flows through a path indicated by a broken line arrow in FIG. 2.

As described above, in the HF band (the first frequency band), the loop defined by the first conductive member 1, the third conductive member 3, and the first connections 51A and 51B defines and functions as a magnetic field antenna that contributes to magnetic field emission. Since the length of the loop is sufficiently short with respect to the wave length in the HF band (the first frequency band), the loop defines a minute loop antenna for communication through magnetic coupling.

Figure 3A:
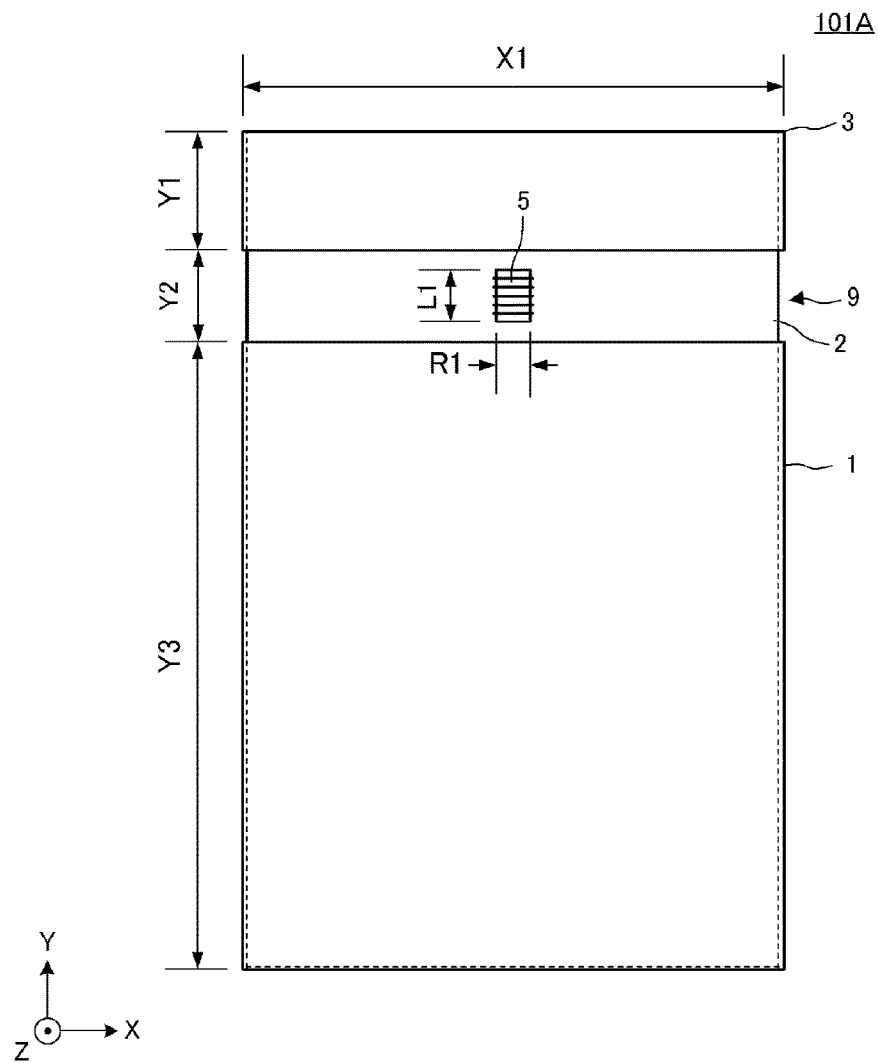
FIG. 3A is a plan view of an antenna device that provides the coupling coefficient of the power supply coil to the loop (the booster antenna) according to the first preferred embodiment of the present invention.
Figure 3B:
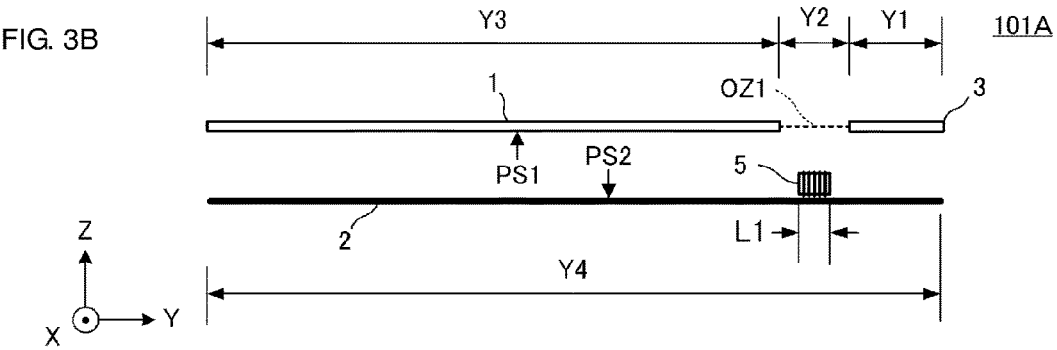
FIG. 3B is a front view of the antenna device shown in FIG. 3A.

The relationship between the location of the power supply coil 5 and the coupling coefficient of the power supply coil 5 to a loop (a booster antenna) operating in the HF band (the first frequency band) will be described next with reference to the drawings. FIG. 3A is a plan view of an antenna device 101A that provides the coupling coefficient of the power supply coil 5 to the loop (the booster antenna) according to the first preferred embodiment, and FIG. 3B is a front view of the antenna device 101A. In FIG. 3B, each portion is shown with an exaggerated thickness. The front views of the other preferred embodiments are also shown with an exaggerated thickness.

The configuration of the antenna device 101A is the same or substantially the same as that of the antenna device 101. In other words, the first conductive member 1, the third conductive member 3, and the first connection (not shown) define a loop, and the power supply coil 5 is mounted on the second main surface PS2 side of the second conductive member 2.

In the antenna device 101A, the power supply coil 5 is disposed, when viewed in the thickness direction (the Z-direction), at the middle of the third conductive member 3 in the longitudinal direction, and along an edge portion of the third conductive member 3 located where a coil opening faces the gap 9. Furthermore, the middle of the power supply coil 5 in the axial direction is disposed at a position adjacent to or in a vicinity of the middle of the gap 9 in the lengthwise direction (the Y-direction). As shown in FIG. 3B, in the antenna device 101A, the power supply coil 5 is closer to the second conductive member 2 than to the first conductive member 1 when viewed in the lengthwise direction (the Y-direction). Furthermore, as shown in FIGS. 3A and 3B, in the antenna device 101A, the second main surface PS2 of the second conductive member 2 overlaps the third conductive member 3 when viewed in the thickness direction (the Z-direction).

Figure 4A:
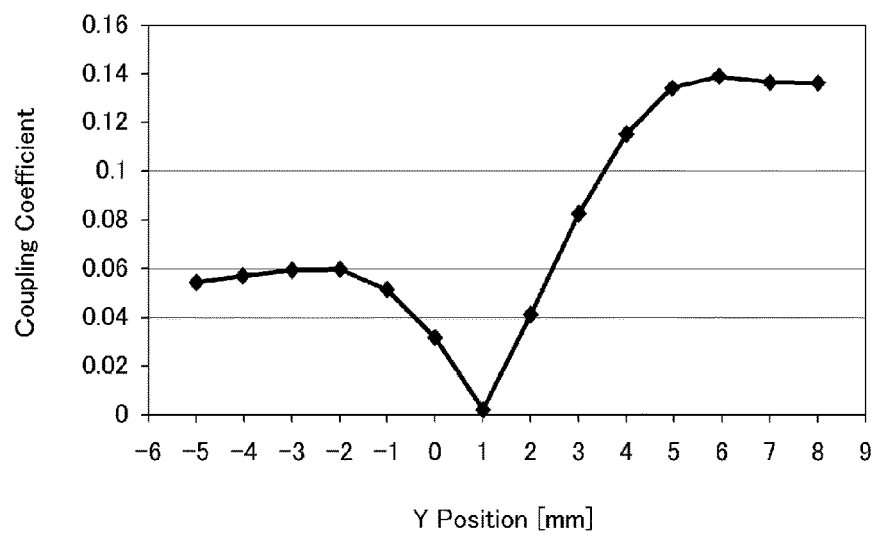
FIG. 4A is a chart showing the coupling coefficient between the loop and the power supply coil with respect to the location of the power supply coil in the antenna device shown in FIGS. 3A and 3B.
Figure 4B:
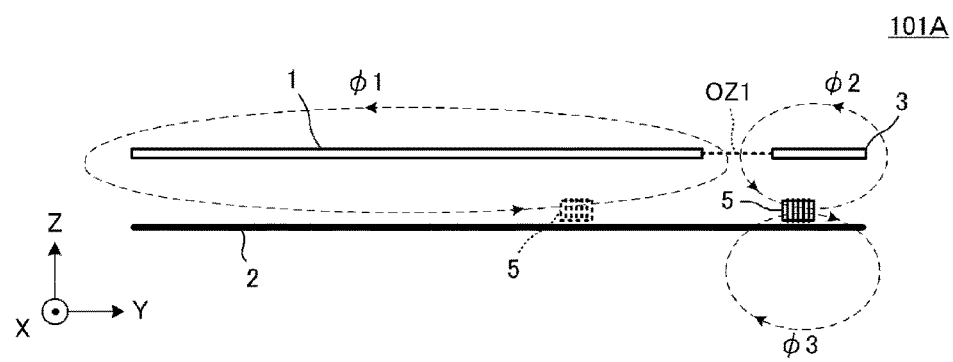
FIG. 4B is a conceptual diagram showing the magnetic fluxes generated by the power supply coil.

In FIGS. 3A and 3B, dimensions of the members are as follows.
- X1 (lengths of the first conductive member 1, the second conductive member 2, and the third conductive member 3 in the crosswise direction): about 60 mm
- Y1 (length of the third conductive member 3 in the lengthwise direction): about 10 mm
- Y2 (length of the gap 9 in the lengthwise direction): about 2 mm
- Y3 (length of the first conductive member 1 in the lengthwise direction): about 111.5 mm
- Y4 (length of the second conductive member 2 in the lengthwise direction): about 123.5 mm
- R1 (diameter of the power supply coil 5): about φ2.8 mm
- L1 (length of power supply coil 5 in the axial direction): about 5.7 mm FIG. 4A is a chart showing the coupling coefficient between the loop and the power supply coil 5 with respect to the location of the power supply coil 5 in the antenna device 101A, and FIG. 4B is a conceptual diagram showing the magnetic fluxes generated by the power supply coil 5.

FIG. 4A is a chart showing the coupling coefficient of the power supply coil 5 to the loop with respect to the up and down movement of the power supply coil 5 in the Y-direction in the unit of about 1 mm with respect to a reference position ("Y Position=0") of the power supply coil 5 in the lengthwise direction (the Y-direction) described above. In FIG. 4A, in a case in which the power supply coil 5 is, in the lengthwise direction (the Y-direction), moved in the upwards direction in FIG. 3A, the Y Position is a positive (+) value, and in a case in which the power supply coil 5 is moved in the downwards direction in FIG. 3A, the Y Position is a negative (−) value. Furthermore, the middle of the gap 9 in the lengthwise direction (the Y-direction) satisfies "Y Position"=about 1.85 mm, for example. In other words, "Y Position"=0 is a position on the lower side with respect to the middle of the gap 9 in the lengthwise direction (the Y-direction). The charts showing the coupling coefficient between the loop and the power supply coil in the other preferred embodiments include the same or similar reference positions and directions.

As shown FIG. 4A, the coupling coefficient between the loop and the power supply coil 5 is 0 when the position of the power supply coil 5 in the lengthwise direction (the Y-direction) satisfies "Y Position"=about 1 mm, for example. The number of interlinkages of the magnetic flux generated from the power supply coil 5 to the loop is canceled out to zero or substantially zero in a case in which a loop opening OZ1 is parallel or substantially parallel to a coil axis of the power supply coil 5 and in which the loop opening OZ1 and the power supply coil 5 nearly overlap each other.

Furthermore, as the position (the "Y Position") of the power supply coil 5 in the Y-direction is moved in the positive direction or in the negative direction, the coupling coefficient becomes higher. The magnetic flux generated from the power supply coil 5 defines a loop along the first conductive member 1 and interlinks with the loop opening OZ1 (see magnetic flux φ1 in FIG. 4B). Furthermore, the magnetic flux generated by the power supply coil 5 defines a loop along the third conductive member 3 and interlinks with the loop opening OZ1 (see magnetic flux φ2 in FIG. 4B).

As shown in FIG. 4A, the coupling coefficient in a case in which the position (the "Y Position") of the power supply coil 5 in the Y-direction is moved in the positive direction is higher than a case in which the position (the "Y Position") of the power supply coil 5 in the Y-direction is moved in the negative direction. In other words, the coupling coefficient is able to be increased when the power supply coil 5 is closer to the third conductive member 3 than to the first conductive member 1.

In other words, when viewed in the thickness direction (the Z-direction), as the area in which the power supply coil 5 overlaps the third conductive member 3 becomes larger than the area in which the power supply coil 5 overlaps the first conductive member 1, the coupling coefficient between the loop and the power supply coil 5 becomes higher. When viewed in the thickness direction (the Z-direction), the width (the length in the Y-direction) of the third conductive member 3, which has an area that is smaller than the area of the first conductive member 1, is shorter than the width (the length in the Y-direction) of the first conductive member 1 and the magnetic flux φ2 that interlinks with the third conductive member 3 is more easily formed than the magnetic flux φ1 that interlinks with the first conductive member 1.

Furthermore, as shown in FIG. 4A, when "Y Position"=about 6 mm, for example, the coupling coefficient between the loop and the power supply coil 5 becomes the largest.

In FIG. 4A, when "Y Position"≥about 5 mm, the entire power supply coil 5 is at a position overlapping the third conductive member 3 when viewed in the thickness direction (the Z-direction), and the coupling coefficient between the loop and the power supply coil is high. Accordingly, the distance at which the magnetic flux is radiated (collected) with the loop becomes large and coupling to the antenna coil of the communication partner becomes easier. Accordingly, as a result, an antenna device with excellent communication characteristics is able to be provided. Furthermore, as shown in FIG. 4A, the coupling coefficient between the loop and the power supply coil 5 is stable with respect to the change in position in the Y-direction when the power supply coil 5 is positioned between the second conductive member 2 and the third conductive member 3. Accordingly, in the above range, the change in the coupling coefficient between the loop and the power supply coil 5 generated by the change in the position of the power supply coil 5 is small.

Furthermore, in the antenna device 101A, in the thickness direction (Z-direction), the second conductive member 2 is, with respect to the power supply coil 5, disposed on the side (the side below the power supply coil 5 in FIG. 3B) opposite to the side on which the first conductive member 1 and the third conductive member 3 are disposed. Accordingly, in a case in FIG. 4B in which a magnetic flux φ3 that defines a large loop on the lower side of the power supply coil 5 is generated, an eddy current is generated in the second conductive member 2 and the magnetic flux φ3 is cancelled out or substantially cancelled out. Accordingly, with the above configuration, formation of a magnetic flux that does not interlink with the loop opening OZ1 is significantly reduced or prevented and a magnetic flux that does not contribute to the coupling between the loop and the power supply coil 5 is significantly reduced or prevented. Accordingly, as a result, the coupling coefficient between the loop and the power supply coil 5 is significantly increased.

Figure 5A:
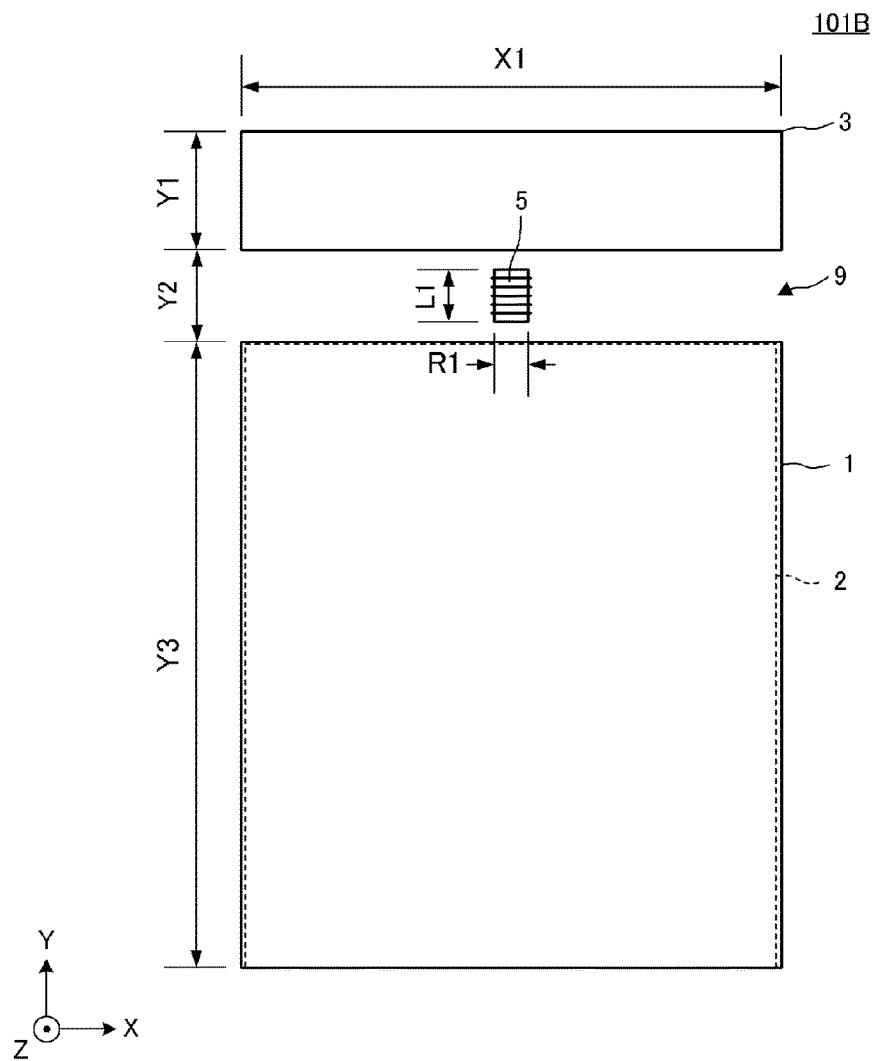
FIG. 5A is a plan view of an antenna device that provides the coupling coefficient of the power supply coil to a loop (a booster antenna) according to the first preferred embodiment of the present invention.
Figure 5B:
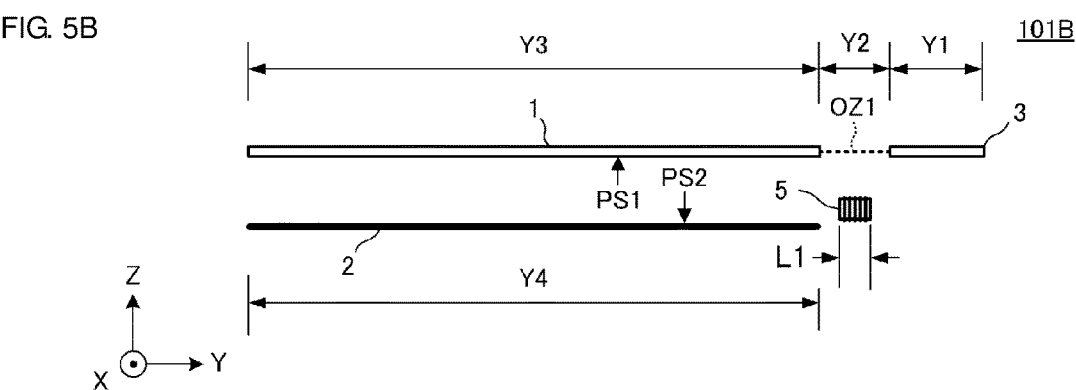
FIG. 5B is a front view of the antenna device shown in FIG. 5A.

FIG. 5A is a plan view of an antenna device 101B that provides the coupling coefficient of the power supply coil 5 to a loop (a booster antenna) according to the first preferred embodiment, and FIG. 5B is a front view of the antenna device 101B.

Similar to the antenna device 101A, the configuration of the antenna device 101B is the same or substantially the same as that of the antenna device 101. However, as shown in FIGS. 5A and 5B, in the antenna device 101B, the second main surface PS2 of the second conductive member 2 does not overlap the third conductive member 3 when viewed in the thickness direction (the Z-direction).

As shown in FIGS. 5A and 5B, the areas of the first conductive member 1 and the second conductive member 2 are the same or substantially the same when viewed in the thickness direction (the Z-direction). Almost the entire first conductive member 1 overlaps the second conductive member 2 when viewed in the thickness direction (the Z-direction).

The power supply coil 5 is mounted on a plane that is an extension of the second main surface PS2 of the second conductive member 2. The power supply coil 5 is disposed, when viewed in the thickness direction (the Z-direction), at the middle of the third conductive member 3 in the longitudinal direction, and along an edge portion of the third conductive member 3 located where a coil opening faces the gap 9. Furthermore, the middle of the power supply coil 5 in the axial direction is disposed at a position adjacent to or in a vicinity of the middle of the gap 9 in the lengthwise direction (the Y-direction). As shown in FIG. 5B, in the antenna device 101B, the power supply coil 5 is closer to the second conductive member 2 than to the first conductive member 1 when viewed in the lengthwise direction (the Y-direction).

In FIGS. 5A and 5B, dimensions of the members are as follows.

Figure 6A:
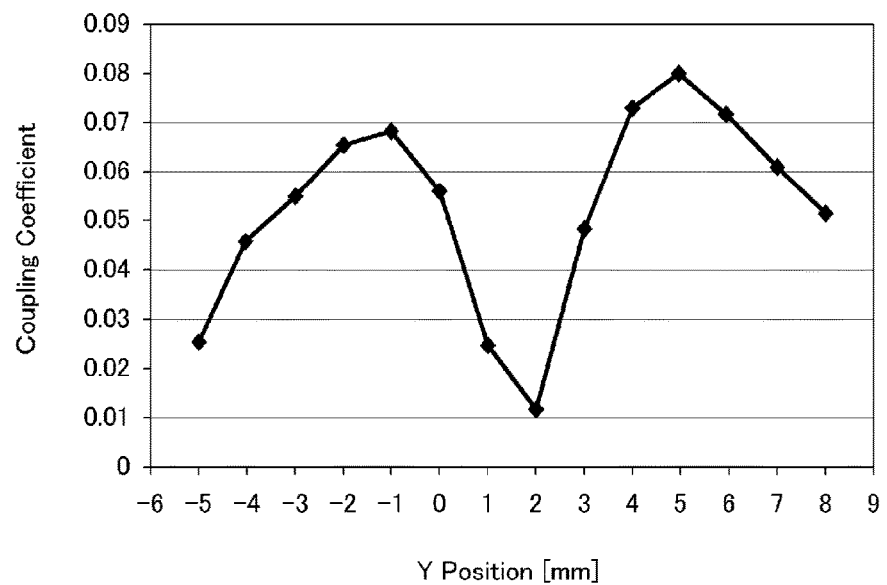
FIG. 6A is a chart showing the coupling coefficient between the loop and the power supply coil with respect to the location of the power supply coil in the antenna device shown in FIGS. 5A and 5B.
Figure 6B:
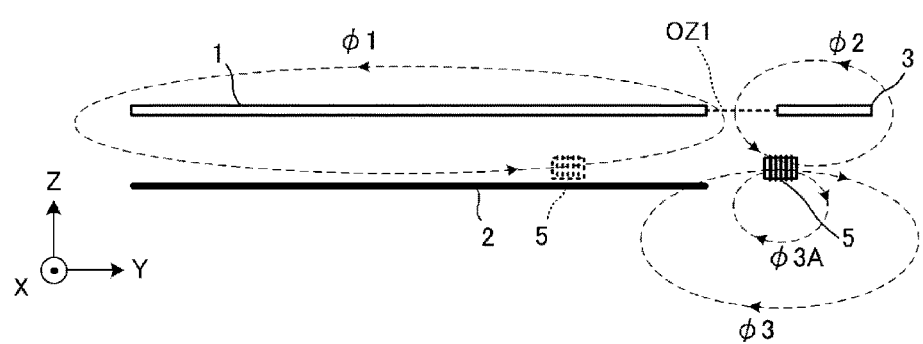
FIG. 6B is a conceptual diagram showing the magnetic fluxes generated by the power supply coil.

X1 (lengths of the first conductive member 1, the second conductive member 2, and the third conductive member 3 in the crosswise direction): about 60 mm Y1 (length of the third conductive member 3 in the lengthwise direction): about 10 mm Y2 (length of the gap 9 in the lengthwise direction): about 2 mm Y3 (length of the first conductive member 1 in the lengthwise direction): about 111.5 mm Y4 (length of the second conductive member 2 in the lengthwise direction): about 111.5 mm R1 (diameter of the power supply coil 5): about φ2.8 mm L1 (length of power supply coil 5 in the axial direction): about 5.7 mm FIG. 6A is a chart showing the coupling coefficient between the loop and the power supply coil 5 with respect to the location of the power supply coil 5 in the antenna device 101B, and FIG. 6B is a conceptual diagram showing the magnetic fluxes generated by the power supply coil 5.

As shown FIG. 6A, the coupling coefficient between the loop and the power supply coil 5 becomes the smallest when the position of the power supply coil 5 in the lengthwise direction (the Y-direction) is "Y Position"=about 2 mm, for example. The number of interlinkages of the magnetic flux generated from the power supply coil 5 to the loop is canceled out to zero or substantially zero in a case in which a loop opening OZ1 is parallel or substantially parallel to a coil axis of the power supply coil 5 and in which the loop opening OZ1 and the power supply coil 5 nearly overlap each other. Although not shown in the experimental result since the inventors moved the position of the power supply coil 5 in the lengthwise direction (the Y-direction) in the unit of about 1 mm, it has been hypothesized that there is a position where the coupling coefficient between the loop and the power supply coil 5 is zero or substantially zero between "Y Position"=about 1 mm and "Y Position"=about 2 mm, for example.

Furthermore, as the position (the "Y Position") of the power supply coil 5 in the Y-direction is moved in the positive direction or in the negative direction, the coupling coefficient becomes higher. The magnetic flux generated by the power supply coil 5 defines a loop along the first conductive member 1 and interlinks with the loop opening OZ1 (see magnetic flux φ1 in FIG. 6B). Furthermore, the magnetic flux generated by the power supply coil 5 defines a loop along the third conductive member 3 and interlinks with the loop opening OZ1 (see magnetic flux φ2 in FIG. 6B).

As shown in FIG. 6A, the coupling coefficient in a case in which the position (the "Y Position") of the power supply coil 5 in the Y-direction is moved in the positive direction is higher than a case in which the position (the "Y Position") of the power supply coil 5 in the Y-direction is moved in the negative direction. In other words, the coupling coefficient is able to be increased when the power supply coil 5 is closer to the third conductive member 3 than to the first conductive member 1.

In other words, when viewed in the thickness direction (the Z-direction), as the area in which the power supply coil 5 overlaps the third conductive member 3 becomes larger than the area in which the power supply coil 5 overlaps the first conductive member 1, the coupling coefficient between the loop and the power supply coil 5 becomes higher. When viewed in the thickness direction (the Z-direction), the width (the length in the Y-direction) of the third conductive member 3, which has an area that is smaller than the area of the first conductive member 1, is shorter than the width (the length in the Y-direction) of the first conductive member 1 and the magnetic flux φ2 that interlinks with the third conductive member 3 is more easily formed than the magnetic flux φ1 that interlinks with the first conductive member 1.

Furthermore, as shown in FIG. 6A, when "Y Position"=about 5 mm, for example, the coupling coefficient between the loop and the power supply coil 5 becomes the largest.

The coupling coefficient between the loop and the power supply coil 5 is lower than that of the antenna device 101A. The reason is the area of the second conductive member 2 in the antenna device 101B is small and a small loop of magnetic flux (a magnetic flux φ3A that does not contribute to the coupling between the loop and the power supply coil 5) that does not interlink with the loop opening OZ1 is provided.

However, in the antenna device 101B, in the thickness direction (Z-direction), the second conductive member 2 is, with respect to the power supply coil 5, disposed on the side (the side below the power supply coil 5 in FIG. 5B or 6B) opposite to the side on which the first conductive member 1 and the third conductive member 3 are disposed. Accordingly, in a case in which a magnetic flux (the magnetic flux φ3 in FIG. 6B that defines a large loop on the lower side of the power supply coil 5) that defines a large loop and that does not interlink with the loop opening is generated, an eddy current is generated in the second conductive member 2 and the magnetic flux is cancelled out or substantially cancelled out. Accordingly, in the antenna 101B, since formation of a magnetic flux that does not interlink with the loop opening OZ1 is partially reduced and a magnetic flux that does not contribute to the coupling between the loop and the power supply coil is significantly reduced or prevented, the coupling coefficient between the loop and the power supply coil 5 is significantly increased.

As shown by comparing FIG. 4A and FIG. 6A, compared with the antenna device 101B, the antenna device 101A usually has a higher coupling coefficient between the loop and the power supply coil 5. In other words, when viewed in the thickness direction (the Z-direction), the configuration (antenna device 101A) in which the second main surface PS2 of the second conductive member 2 overlaps the third conductive member 3 has a higher coupling coefficient between the loop and the power supply coil 5 than the configuration (the antenna device 101B) in which the second main surface PS2 of the second conductive member 2 does not overlap the third conductive member 3. As described above, in a case in which a magnetic flux (the magnetic flux φ3 in FIG. 6B that defines a large loop on the lower side of the power supply coil 5) that does not interlink with the loop opening is generated, an eddy current is generated in the second conductive member 2 and the magnetic flux is cancelled out or substantially cancelled out.

When viewed in the thickness direction (the Z-direction), as the area in which the second main surface PS2 of the second conductive member 2 overlaps the third conductive member 3 becomes larger, formation of a magnetic flux that does not interlink with the loop opening OZ1 is further significantly reduced or prevented and, the coupling coefficient between the loop and the power supply coil 5 is significantly increased.

From the above, the following features and advantages (a) to (i) are able to be provided by the present preferred embodiment.

(a) In the antenna device 101 according to the present preferred embodiment, in the HF band (the first frequency band), the power supply coil 5 is magnetically coupled or electromagnetically coupled to the loop, and the loop defines and functions as a booster antenna for the power supply coil 5. Accordingly, compared with a case in which only the power supply coil 5 is included, the effective coil opening that defines and functions as an antenna is larger, and the range and distance in which the loop radiates (collects) the magnetic flux is larger and coupling to the antenna coil of the communication partner is facilitated. Accordingly, an antenna device with excellent communication characteristics is able to be provided with a simple configuration and without using a large antenna coil.

(b) In the antenna device 101, in the thickness direction (Z-direction), the second conductive member 2 is, with respect to the power supply coil 5, disposed on the side (the side below the power supply coil 5 in FIG. 3B) opposite to the side on which the first conductive member 1 and the third conductive member 3 are disposed. Accordingly, in a case in which a magnetic flux (the magnetic flux φ3 in FIGS. 4B and 5B) that defines a large loop and that does not interlink with the loop opening OZ1 is generated, an eddy current is generated in the second conductive member 2 and the magnetic flux is cancelled out or substantially cancelled out. Accordingly, since formation of a magnetic flux that does not interlink with the loop opening OZ1 is significantly reduced or prevented and a magnetic flux that does not contribute to the coupling between the loop and the power supply coil 5 is significantly reduced or prevented, the coupling coefficient between the loop and the power supply coil 5 is significantly increased.

(c) In the antenna device 101, none of the first conductive member 1, the third conductive member 3, and the first connections 51A and 51B defining the loop is directly coupled to the first power supply circuit 81 operating in the HF band (the first frequency band). Accordingly, the degree of freedom in the mounting positions of the power supply coil 5 and the first power supply circuit 81 is high, and the conductor pattern provided on the main surface of the substrate 6A is able to be simplified. In the present preferred embodiment, the loop is not coupled to the ground conductor, and the power supply coil 5 is coupled in balance to the first power supply circuit 81. Accordingly, the loop and the power supply circuit (the circuit including the first power supply circuit 81 and the power supply coil 5) operating in the HF band described above is able to both be considered as a balanced circuit. However, the present preferred embodiment is not limited to the above configuration, and either one of the loop and the power supply circuit operating in the HF band described above may be an unbalanced circuit, or the loop and the power supply circuit operating in the HF band described above may each be an unbalanced circuit, for example. Even with the above configuration, since the loop and the first power supply circuit 81 are DC insulated with respect to each other and are primarily coupled to each other with a magnetic field interposed therebetween, the antenna device 101 defines and functions as a magnetic field antenna operating in the HF band (the first frequency band).

(d) In the antenna device 101, since a portion of the housing is included as the first conductive member 1, a loop defining and functioning as a magnetic field antenna is able to be easily provided. Accordingly, since a conductor that defines a portion of the loop does not have to be formed separately, the electronic device itself is able to be made small in size, is able to be manufactured easily, and a cost thereof is able to be significantly reduced.

(e) In the antenna device 101, since a portion of the housing is included as the third conductive member 3, a loop defining and functioning as a magnetic field antenna is able to be easily provided. Accordingly, since a conductor that defines a portion of the loop does not have to be formed separately, the electronic device itself is able to be made small in size, is able to be manufactured easily, and a cost thereof is able to be significantly reduced.

(f) In the antenna device 101, the first connection 51A that defines a portion of the loop is coupled adjacent to or in a vicinity of the first end portion E1 of the third conductive member 3. Furthermore, the first connection 51B that defines a portion of the loop is coupled adjacent to or in a vicinity of the second end portion E2 of the third conductive member 3. Accordingly, since the effective coil opening of the loop of the magnetic field antenna defined by the first conductive member 1, the third conductive member 3, and the first connections 51A and 51B is large and the range in which the magnetic flux is radiated (collected) is large, coupling to the antenna coil of the communication partner is facilitated. Accordingly, an antenna device with excellent communication characteristics is able to be provided by a simple configuration and without using a large antenna coil.

(g) In the antenna device 101, since the first connections 51A and 51B are provided by reactance elements, the loop is able to be easily configured as an LC resonant circuit in the HF band.

(h) When viewed in the thickness direction (the Z-direction), the area in which the power supply coil 5 of the antenna device 101 overlaps the third conductive member 3 is larger than the area in which the power supply coil 5 overlaps the first conductive member 1. When viewed in the thickness direction (the Z-direction), since the area of the third conductive member 3 is smaller than the area of the first conductive member 1, the magnetic flux that interlinks with the third conductive member 3 is formed more easily than the magnetic flux that interlinks with the first conductive member 1. Accordingly, with the above a configuration, the coupling coefficient between the third conductive member 3 that defines a portion of the loop and the power supply coil 5 is able to be increased, and the antenna characteristics are able to be significantly improved.

(i) When viewed in the thickness direction (the Z-direction), the entire power supply coil 5 of the antenna device 101 overlaps the third conductive member. With the above configuration, the coupling coefficient between the loop and the power supply coil is high. Accordingly, the distance at which the magnetic flux is radiated (collected) with the loop becomes large and coupling to the antenna coil of the communication partner becomes easier. Accordingly, as a result, an antenna device with excellent communication characteristics is able to be provided.

While the present preferred embodiment describes the antenna device 101 in which the first conductive member 1 and the third conductive member 3 are flush with each other (on the same or substantially the same height in the Z-direction), the configuration of the antenna device 101 is not limited to the above configuration. The relationship in height in the thickness direction (the Z-direction) between the first conductive member 1 and the third conductive member 3 is able to be appropriately changed within the range in which the features and advantages of having a loop defining and functioning as a magnetic field antenna is able to be provided. Changing the relationship in height in the thickness direction (the Z-direction) between the first conductive member 1 and the third conductive member 3 changes the directivity of the antenna.

Furthermore, in the present preferred embodiment, while an example is provided in which the first connection 51A is coupled adjacent to or in a vicinity of the first end portion E1 in the longitudinal direction of the third conductive member 3, and the first connection 51B is coupled adjacent to or in a vicinity of the second end portion E2, the configuration of these elements is not limited to the above configuration. The coupling position (in the X-direction and the Y-direction) is able to be appropriately changed as long as a loop is provided, the loop defines and functions as a magnetic field antenna that contributes to the magnetic field emission, and an opening area that provides magnetic coupling with the antenna on the communication partner side is able to be provided. For example, the first connection 51A is preferably coupled to the third conductive member 3 in the range, in the crosswise direction (the X-direction), from the first end portion E1 of the third conductive member 3 to one third of the length of the third conductive member in the crosswise direction, and the first connection 51B is preferably coupled to the third conductive member 3, in the range in the cross wise direction (the X-direction), from the second end portion E2 of the third conductive member 3 to one third of the length of the third conductive member in the crosswise direction. However, as described above, an antenna having excellent communication characteristics in the loop in the HF band is able to be provided when the coupled portion is adjacent to or in a vicinity of the end portion.

Furthermore, in the present preferred embodiment, an example is provided in which the first conductive member 1 and the third conductive member 3 are portions of the back housing of a smartphone, for example. However, the configuration of the first conductive member 1 and the third conductive member 3 is not limited to the above configuration. The first conductive member 1 and the third conductive member 3 may include conductors provided inside a housing of a smartphone, or the like, for example.

In the present preferred embodiment, while the reactance elements are coupled between the first conductive member 1 and the third conductive member 3 with the connection conductors and the contact pins interposed therebetween, the reactance elements may be directly coupled to the first conductive member 1 and the third conductive member 3, for example.

Furthermore, while an example of the antenna device 101 in which the first connection 51A includes a single reactance element (the inductor L11), and the first connection 51B includes a single reactance element (the capacitor C11) has been provided, the configuration of the antenna device 101 is not limited to the above configuration. The first connection may be an LC circuit including a plurality of reactance elements, for example. In the above case, the plurality of reactance elements may be a series LC circuit in which a plurality of reactance elements are coupled in series, or may be a parallel LC circuit in which a plurality of reactance elements are coupled in parallel, for example. Furthermore, the first connection may be a combination of a series LC circuit and a parallel LC circuit, for example.

Moreover, in the present preferred embodiment, when viewed in the thickness direction (the Z-direction), the power supply coil 5 is disposed adjacent to or in a vicinity of the middle of the third conductive member 3 in the longitudinal direction. However, the configuration of the power supply coil 5 is not limited to the above configuration. The power supply coil 5 may be disposed adjacent to or in a vicinity of either the first end portion E1 of the third conductive member 3 or the second end portion E2, for example.

Furthermore, in the present preferred embodiment, when viewed in the thickness direction (the Z-direction), the power supply coil 5 is disposed and the entirety thereof overlaps the third conductive member 3. However, the configuration of the power supply coil 5 is not limited to the above configuration. When viewed in the thickness direction (the Z-direction), the power supply coil 5 may be disposed with only a portion thereof overlapping the third conductive member 3, for example. Alternatively, when viewed in the thickness direction (the Z-direction), the power supply coil 5 may be disposed with the entirety thereof not overlapping the third conductive member 3, for example. However, in the above case, the power supply coil 5 is preferably disposed adjacent to or in a vicinity of the third conductive member 3 with respect to the first conductive member 1 when viewed in the thickness direction (the Z-direction), for example. Note that "the power supply coil 5 being disposed adjacent to or in a vicinity of the third conductive member 3 with respect to the first conductive member 1" denotes, in a case in which the first conductive member 1 and the third conductive member 3 each include a planar or substantially planar portion extending in the lengthwise and crosswise directions (the X-direction and the Y-direction) and the power supply coil 5 does not overlap the third conductive member 3 when viewed in the thickness direction (the Z-direction), the shortest distance between an outer edge of the power supply coil 5 adjacent to or in a vicinity of the third conductive member 3 and an outer edge of the third conductive member 3 is shorter than the shortest distance between an outer edge of the power supply coil 5 adjacent to or in a vicinity of the first conductive member 1 and an outer edge of the first conductive member 1. In a case in which the first conductive member 1 and the third conductive member 3 each include a planar or substantially planar portion extending in the lengthwise and crosswise directions (the X-direction and the Y-direction) and the power supply coil 5 overlaps the third conductive member 3 when viewed in the thickness direction (the Z-direction), the above feature denotes that the power supply coil 5 does not overlap the first conductive member 1. Alternatively, the above feature denotes that the area in which the power supply coil 5 overlaps the third conductive member 3 is larger than the area in which the power supply coil 5 overlaps the first conductive member 1 when viewed in the thickness direction (the Z-direction). In a case in which either of the first conductive member 1 and the third conductive member 3 does not include a planar or substantially planar portion that extends in the lengthwise and crosswise directions (the X-direction and the Y-direction), the above feature denotes that the shortest or substantially shortest distance between the outer edge of the power supply coil 5 adjacent to or in a vicinity of the third conductive member 3 and the planar or substantially planar portion (or the outer edge) of the third conductive member 3 is shorter than the shortest or substantially shortest distance between the outer edge of the power supply coil 5 adjacent to or in a vicinity of the first conductive member 1 and the planar or substantially planar portion (or the outer edge) of the first conductive member 1.

Second Preferred Embodiment

Figure 7A:
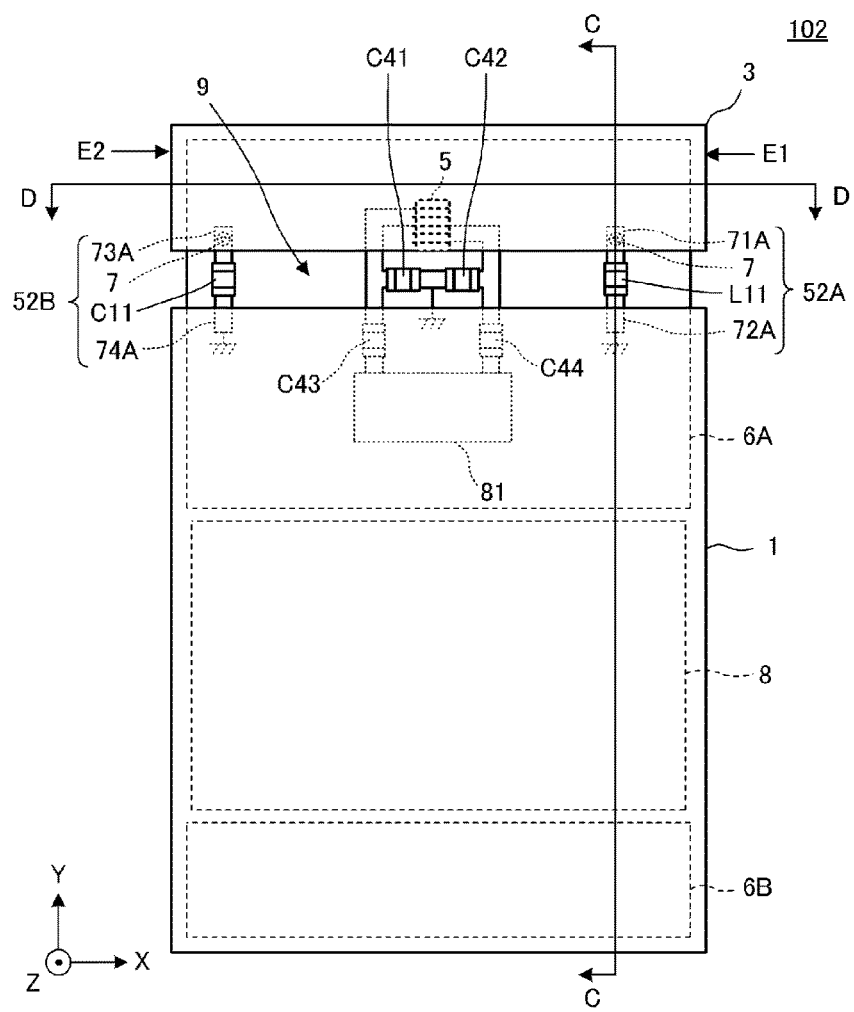
FIG. 7A is a plan view of an antenna device according to a second preferred embodiment of the present invention.
Figure 7B:
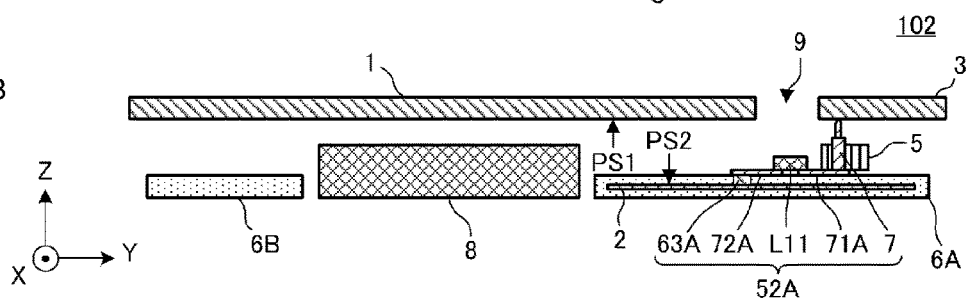
FIG. 7B is a cross-sectional view taken along line C-C in FIG. 7A.
Figure 7C:
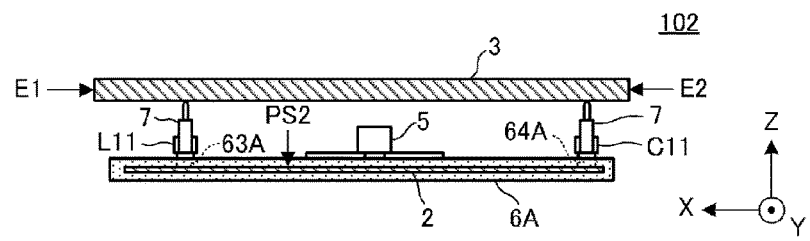
FIG. 7C is a cross-sectional view taken along line D-D in FIG. 7A.
Figure 8:
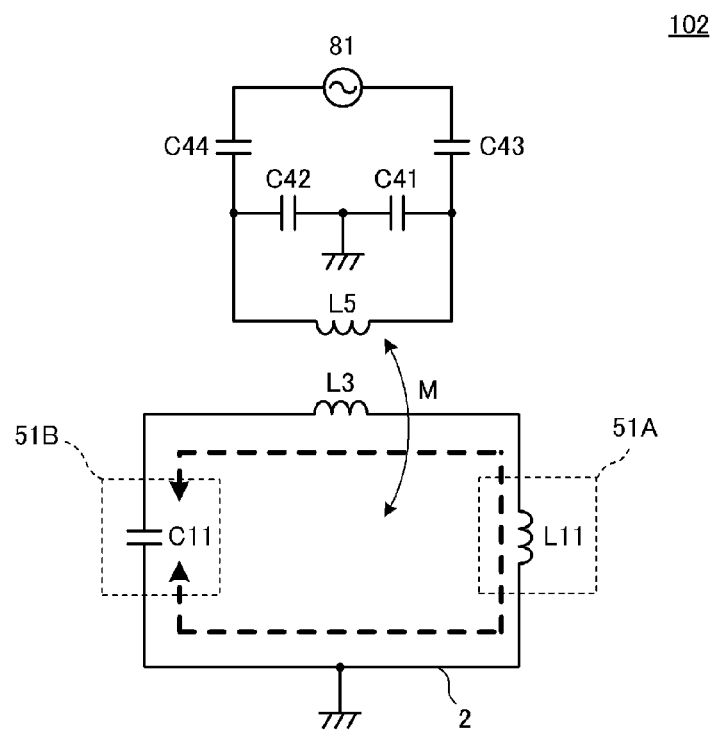
FIG. 8 is an equivalent circuit diagram of lumped elements in the antenna device shown in FIGS. 7A to 7C.

FIG. 7A is a plan view of an antenna device 102 according to a second preferred embodiment of the present invention, FIG. 7B is a cross-sectional view taken along line C-C in FIG. 7A, and FIG. 7C is a cross-sectional view taken along line D-D in FIG. 7A. FIG. 8 is an equivalent circuit diagram of lumped elements in the antenna device 102.

The antenna device 102 according to the second preferred embodiment is different from the antenna device 101 in that, instead of the first conductive member, the second conductive member 2 that is the ground conductor of the substrate 6A is included as a portion of the loop. Other configurations of the antenna device 102 are the same or substantially the same as those of the antenna device 101 according to the first preferred embodiment.

The substrate 6A of the antenna device 102 further includes interlayer connection conductors 63A and 64A therein. The interlayer connection conductors 63A and 64A are conductors that extend in the thickness direction (the Z-direction) of the substrate 6A and are via conductors, for example.

A second connection 52A according to the present preferred embodiment includes the inductor L11, the connection conductors 71A and 72A, the contact pin 7, and the interlayer connection conductor 63A, and is coupled between the first conductive member 1 and the third conductive member 3. Specifically, the first end of the inductor L11 is coupled adjacent to or in a vicinity of the first end portion E1 of the third conductive member 3 with the connection conductor 71A and the contact pin 7 interposed therebetween, and the second end of the inductor L11 is coupled to the second conductive member 2 with the connection conductor 72A and the interlayer connection conductor 63A interposed therebetween.

A second connection 52B according to the present preferred embodiment includes the capacitor C11, the connection conductors 73A and 74A, the contact pin 7, and the interlayer connection conductor 64A, and is coupled between the first conductive member 1 and the third conductive member 3. Specifically, the first end of the capacitor C11 is coupled adjacent to or in a vicinity of the second end portion E2 of the third conductive member 3 with the connection conductor 73A and the contact pin 7 interposed therebetween, and the second end of the capacitor C11 is coupled to the second conductive member 2 with the connection conductor 74A and the interlayer connection conductor 64A interposed therebetween.

As shown in FIG. 7, in the antenna device 102, the second conductive member 2, the third conductive member 3, and the second connections 52A and 52B define a loop.

The power supply coil 5 is magnetically coupled or electromagnetically coupled (magnetically coupled and electric-field coupled) to the loop including the second conductive member 2, the third conductive member 3, and the second connections 52A and 52B.

Specifically, the power supply coil 5 according to the present preferred embodiment is disposed, when viewed in the thickness direction (the Z-direction), adjacent to or in a vicinity of the middle of the third conductive member 3 in the longitudinal direction, and along an edge portion of the third conductive member 3 located where a coil opening faces the gap 9. In other words, the power supply coil 5 is disposed in an orientation interlinking the magnetic flux passing through the power supply coil 5 and the loop to each other. Accordingly, the power supply coil 5 is primarily magnetically coupled to the loop (particularly, the third conductive member 3).

Furthermore, as shown in FIG. 7B, when viewed in the thickness direction (the Z-direction), the entire power supply coil 5 overlaps the third conductive member, and is disposed between the second conductive member 2 and the third conductive member 3. In other words, when viewed in the thickness direction (the Z-direction), the power supply coil 5 is closer to the third conductive member 3 than to the first conductive member 1. Accordingly, the power supply coil 5 is not only magnetically coupled to the third conductive member but is also electromagnetically coupled, which includes electric-field coupling, to the third conductive member.

As shown in FIG. 8, in the HF band (the first frequency band), the loop described above defines an LC resonant circuit defined by the inductor L3, the inductor L11, and the capacitor C11. As described above, the power supply coil 5 is magnetically coupled or electromagnetically coupled to the loop. The loop described above LC resonates in the HF band, and a resonance current flows at the edges of the first conductive member 1 and the third conductive member 3. Accordingly, in the HF band (the first frequency band), the electric current flows through a path indicated by a broken line arrow in FIG. 8.

As described above, in the HF band (the first frequency band), the loop defined by the second conductive member 2, the third conductive member 3, and the second connections 52A and 52B defines and functions as a magnetic field antenna that contributes to magnetic field emission.

Figure 9A:
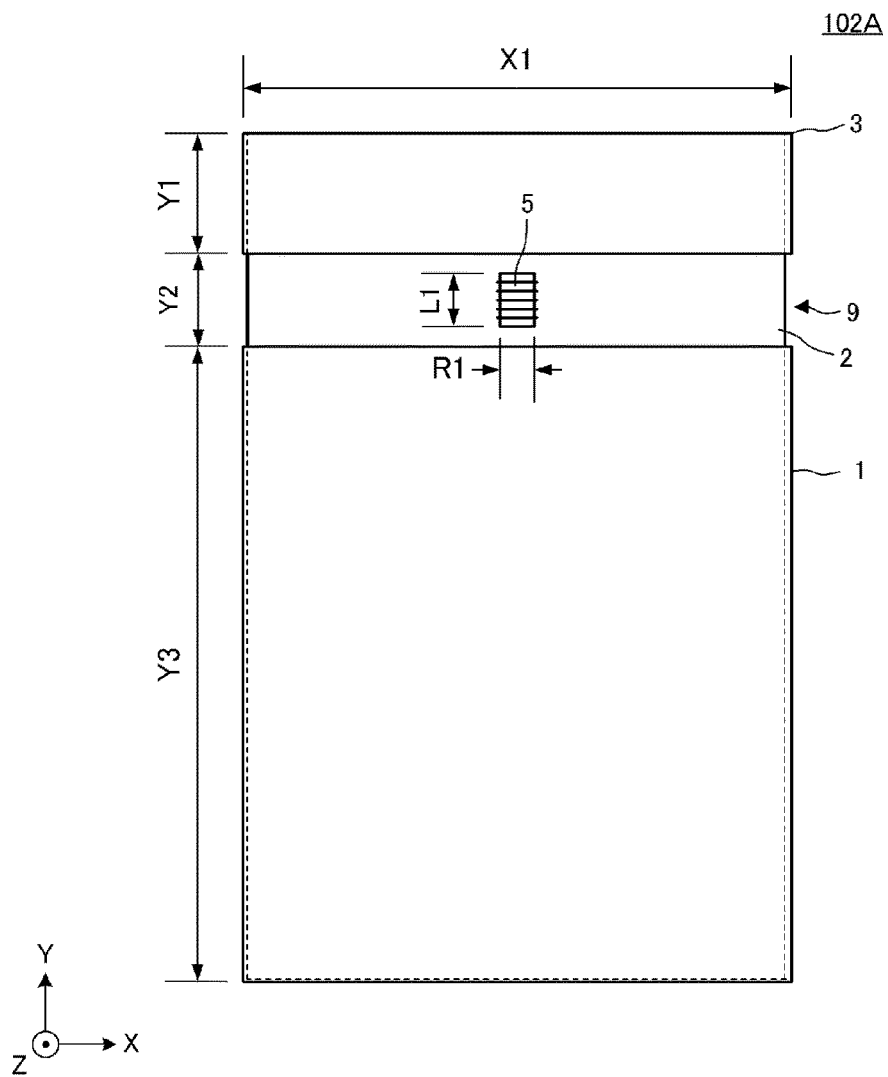
FIG. 9A is a plan view of an antenna device that provides the coupling coefficient of the power supply coil to the loop (the booster antenna) according to the second preferred embodiment of the present invention.

The relationship between the location of the power supply coil 5 and the coupling coefficient of the power supply coil 5 to a loop (a booster antenna) in the HF band (the first frequency band) will be described next with reference to the drawings. FIG. 9A is a plan view of an antenna device 102A that provides the coupling coefficient of the power supply coil 5 to the loop (the booster antenna) according to the second preferred embodiment, and FIG. 9B is a front view of the antenna device 102A.

The configuration of the antenna device 102A is the same or substantially the same as that of the antenna device 102. In other words, the second conductive member 2, the third conductive member 3, and the first connection (not shown) define a loop, and the power supply coil 5 is mounted on the second main surface PS2 side of the second conductive member 2.

In the antenna device 102A, the power supply coil 5 is disposed between a plane (an XY-plane) including the first main surface PS1 of the first conductive member 1, and a plane (an XY-plane) including the second main surface PS2 of the second conductive member 2. Furthermore, the power supply coil 5 is disposed, when viewed in the thickness direction (the Z-direction), at the middle of the third conductive member 3 in the longitudinal direction, and along an edge portion of the third conductive member 3 located where a coil opening faces the gap 9. Furthermore, the middle of the power supply coil 5 in the axial direction is disposed at a position adjacent to or in a vicinity of the middle of the gap 9 in the lengthwise direction (the Y-direction). As shown in FIG. 9(B), in the antenna device 102A, the power supply coil 5 is closer to the second conductive member 2 than to the first conductive member 1 when viewed in the lengthwise direction (the Y-direction). Furthermore, as shown in FIGS. 9A and 9B, in the antenna device 102A, the second main surface PS2 of the second conductive member 2 overlaps the third conductive member 3 when viewed in the thickness direction (the Z-direction).

Figure 9B:
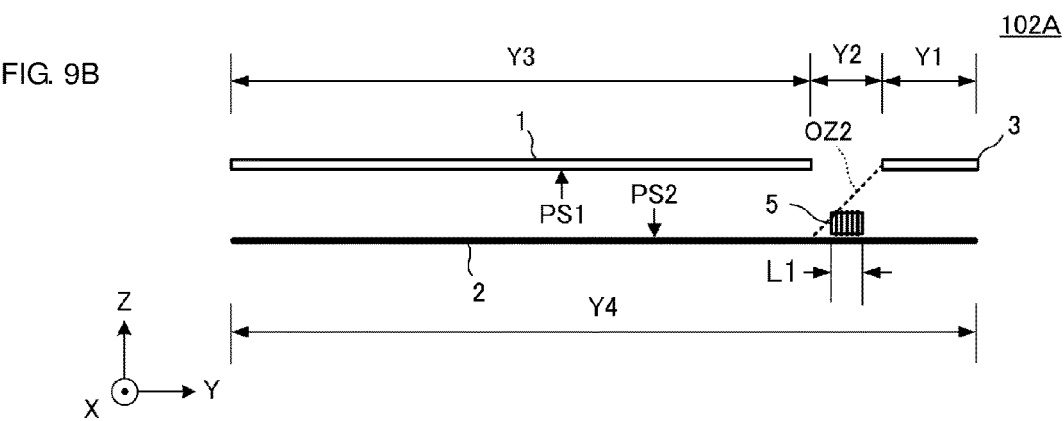
FIG. 9B is a front view of the antenna device shown in FIG. 9A.
Figure 10A:
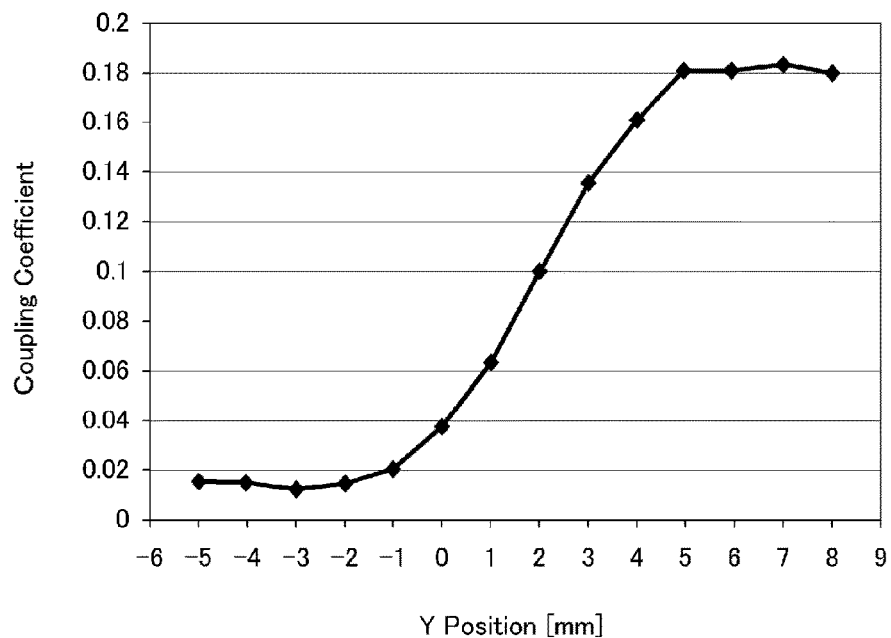
FIG. 10A is a chart showing the coupling coefficient between the loop and the power supply coil with respect to the location of the power supply coil in the antenna device shown in FIGS. 9A and 9B.
Figure 10B:
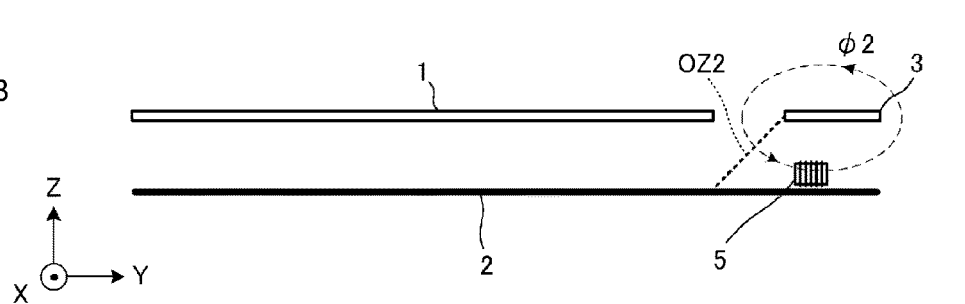
FIG. 10B is a conceptual diagram showing the magnetic flux $\varphi 2$ generated by the power supply coil.
Figure 10C:
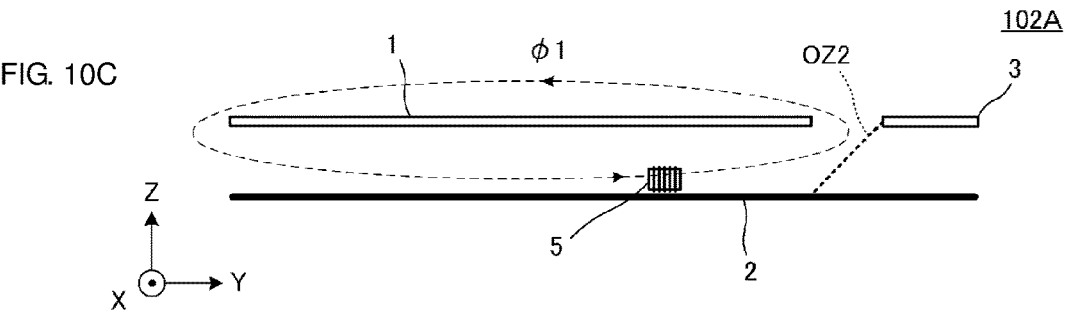
FIG. 10C is a conceptual diagram showing the magnetic flux $\varphi 1$ generated by the power supply coil.

In FIGS. 9A and 9B, dimensions of the components are the same or substantially the same as those of the antenna device 101A according to the first preferred embodiment. FIG. 10A is a chart showing the coupling coefficient between the loop and the power supply coil 5 with respect to the location of the power supply coil 5 in the antenna device 102A, FIG. 10B is a conceptual diagram showing the magnetic flux φ2 generated by the power supply coil 5, and FIG. 10(C) is a conceptual diagram showing the magnetic flux φ1 generated by the power supply coil 5.

As shown in FIG. 10A, as the position (the "Y Position") of the power supply coil 5 in the Y-direction is moved in the positive direction, the coupling coefficient becomes higher. In other words, the coupling coefficient is able to be increased when the power supply coil 5 is closer to the third conductive member 3 than to the first conductive member 1. In other words, when viewed in the thickness direction (the Z-direction), as the area in which the power supply coil 5 overlaps the third conductive member 3 becomes larger than the area in which the power supply coil 5 overlaps the first conductive member 1, the coupling coefficient between the loop and the power supply coil 5 becomes higher. When viewed in the thickness direction (the Z-direction), the width (the length in the Y-direction) of the third conductive member 3, which has an area that is smaller than the area of the first conductive member 1, is shorter than the width (the length in the Y-direction) of the first conductive member 1 and the magnetic flux φ2 that interlinks with the third conductive member 3 is more easily formed than the magnetic flux φ1 that interlinks with the first conductive member 1.

As shown by comparing FIG. 4A and FIG. 10A, compared with the antenna device 101A, the antenna device 102A usually has a higher coupling coefficient between the loop and the power supply coil 5. When viewed in a winding axial direction (the Y-direction) of the power supply coil 5, a loop opening OZ2 of the antenna device 102A has a portion that overlaps the opening of the power supply coil 5 and is closer to the opening when compared with the loop opening OZ1 of the antenna device 101A.

As shown in FIG. 10A, when "Y Position"=about 5 mm, for example, the coupling coefficient between the loop and the power supply coil 5 becomes the largest.

In FIG. 10A, when "Y Position"≥about 5 mm, for example, the entire power supply coil 5 is at a position overlapping the third conductive member 3 when viewed in the thickness direction (the Z-direction), and the coupling coefficient between the loop and the power supply coil is high. Accordingly, the distance at which the magnetic flux is radiated (collected) with the loop becomes large and coupling to the antenna coil of the communication partner becomes easier. Accordingly, as a result, an antenna device with excellent communication characteristics is able to be provided. Furthermore, as shown in FIG. 10A, the coupling coefficient between the loop and the power supply coil 5 is stable with respect to the change in position in the Y-direction when the power supply coil 5 is positioned between the second conductive member 2 and the third conductive member 3. Accordingly, in the above range, the change in the coupling coefficient between the loop and the power supply coil 5 generated by the change in the position of the power supply coil 5 is small.

Furthermore, in the antenna device 102A, in the thickness direction (Z-direction), the second conductive member 2 is, with respect to the power supply coil 5, disposed on the side (the side below the power supply coil 5 in FIG. 10B) opposite to the side on which the first conductive member 1 and the third conductive member 3 are disposed. Accordingly, in a case in FIG. 10B in which a magnetic flux (see the magnetic flux φ3 in FIG. 4B) that defines a large loop on the lower side of the power supply coil 5 is generated, an eddy current is generated in the second conductive member 2 and the magnetic flux is cancelled out or substantially cancelled out. Accordingly, with the above configuration, formation of a magnetic flux that does not interlink with the loop opening OZ2 is significantly reduced or prevented and a magnetic flux that does not contribute to the coupling between the loop and the power supply coil 5 is significantly reduced or prevented. Accordingly, as a result, the coupling coefficient between the loop and the power supply coil 5 is significantly increased.

On the other hand, as the position (the "Y Position") of the power supply coil 5 in the Y-direction is moved in the negative direction, the coupling coefficient becomes lower. The magnetic flux generated by the power supply coil 5 passes the gap 9 and defines a loop along the first conductive member 1 (the magnetic flux φ1 in FIG. 10C). As shown in FIG. 10C, since the magnetic flux φ1 does not interlink with the loop opening OZ2, the magnetic flux φ1 does not contribute to the coupling between the loop and the power supply coil 5. Accordingly, the coupling coefficient between the loop and the power supply coil 5 decreases.

Figure 11A:
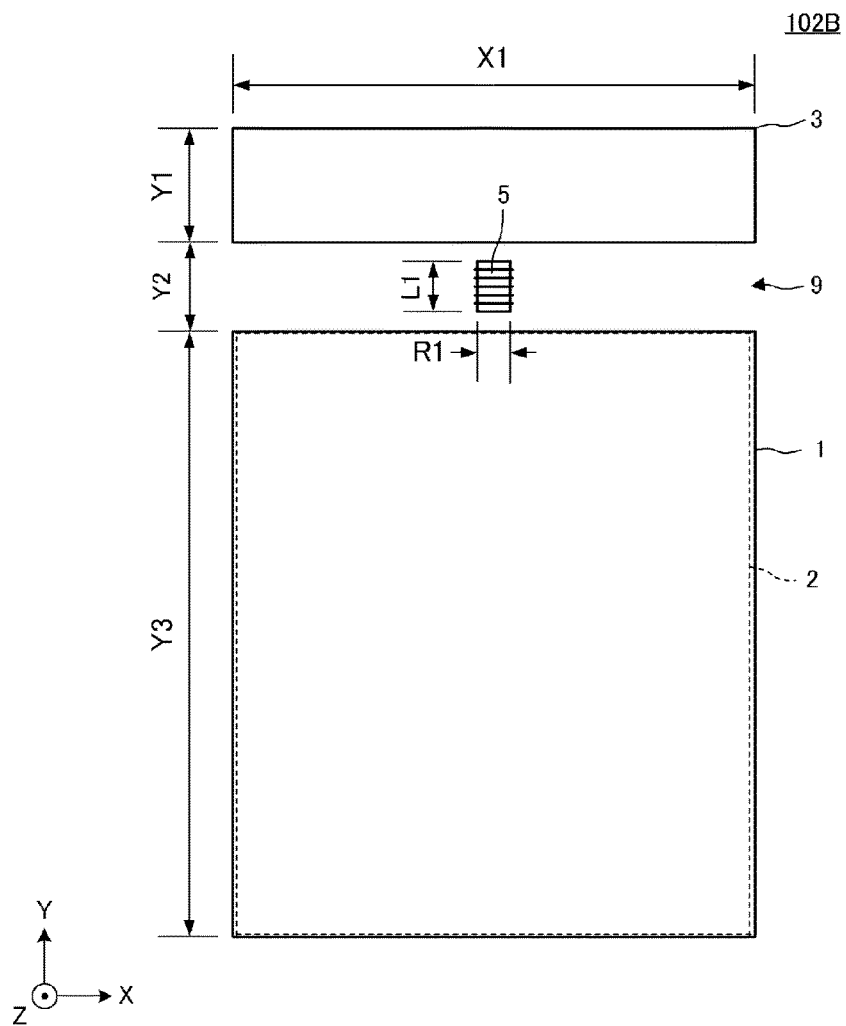
FIG. 11A is a plan view of an antenna device that provides the coupling coefficient of the power supply coil to the loop (the booster antenna) according to the second preferred embodiment of the present invention.
Figure 11B:
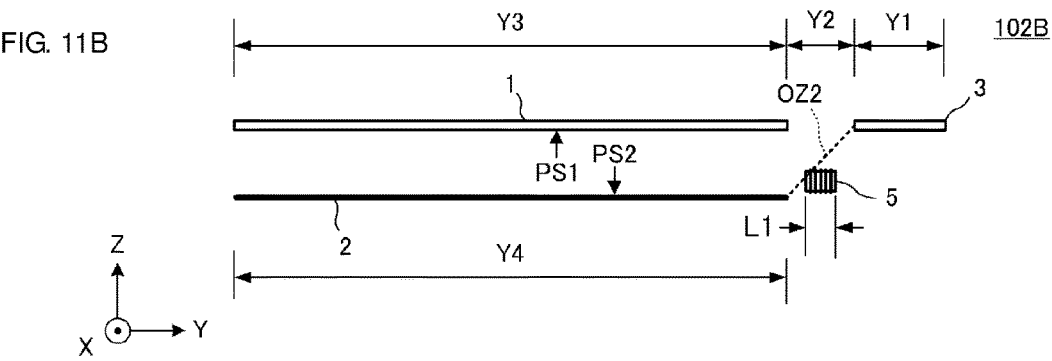
FIG. 11B is a front view of the antenna device shown in FIG. 11A.

FIG. 11A is a plan view of an antenna device 102B that provides the coupling coefficient of the power supply coil 5 to the loop (the booster antenna) according to the second preferred embodiment, and FIG. 11B is a front view of the antenna device 102B.

Similar to the antenna device 102A, the configuration of the antenna device 102B is the same or substantially the same as that of the antenna device 102. However, as shown in FIGS. 11A and 11B, in the antenna device 102B, the second main surface PS2 of the second conductive member 2 does not overlap the third conductive member 3 when viewed in the thickness direction (the Z-direction).

As shown in FIGS. 11A and 11B, the areas of the first conductive member 1 and the second conductive member 2 are the same or substantially the same when viewed in the thickness direction (the Z-direction). Nearly the entire first conductive member 1 overlaps the second conductive member 2 when viewed in the thickness direction (the Z-direction).

The power supply coil 5 is mounted on a plane that is an extension of the second main surface PS2 of the second conductive member 2. The power supply coil 5 is disposed, when viewed in the thickness direction (the Z-direction), at the middle of the third conductive member 3 in the longitudinal direction, and along an edge portion of the third conductive member 3 located where a coil opening faces the gap 9. Furthermore, the middle of the power supply coil 5 in the axial direction is disposed at a position adjacent to or in a vicinity of the middle of the gap 9 in the lengthwise direction (the Y-direction). As shown in FIG. 11B, in the antenna device 102B, the power supply coil 5 is closer to the second conductive member 2 than to the first conductive member 1 when viewed in the lengthwise direction (the Y-direction).

In FIGS. 11A and 11B, dimensions of the components are the same or substantially the same as those of the antenna device 101B according to the first preferred embodiment.

Figure 12A:
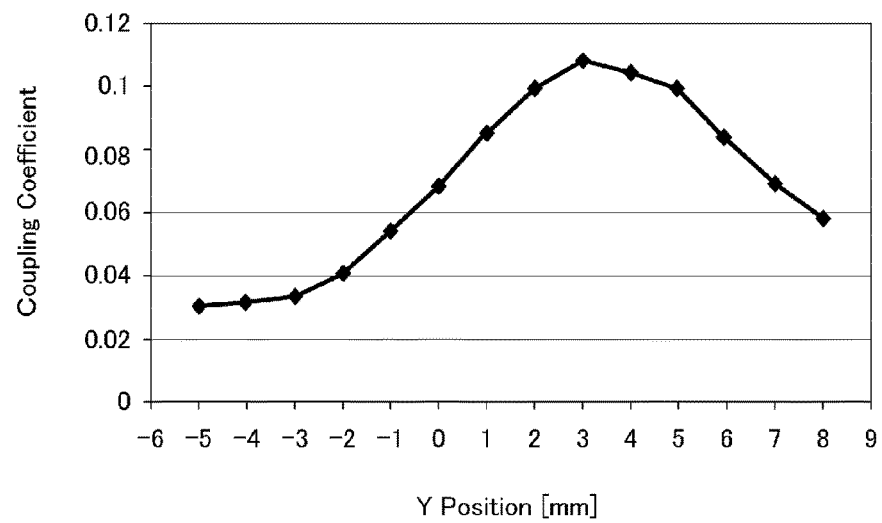
FIG. 12A is a chart showing the coupling coefficient between the loop and the power supply coil with respect to the location of the power supply coil in the antenna device shown in FIGS. 11A and 11B.
Figure 12B:
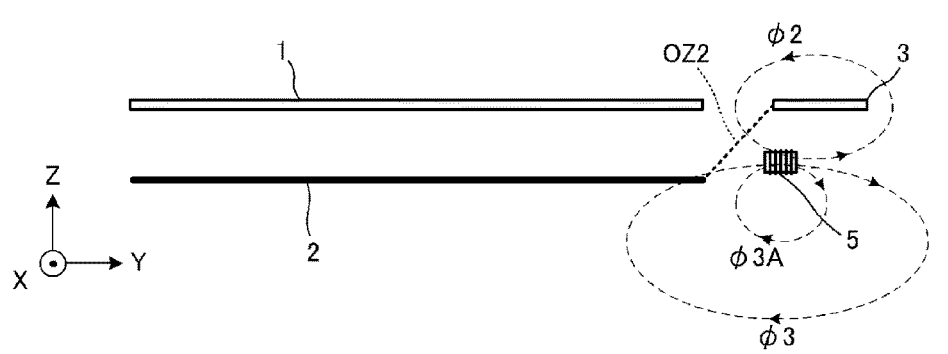
FIG. 12B is a conceptual diagram showing the magnetic fluxes $\varphi 2$ and $\varphi A$ generated by the power supply coil.
Figure 12C:
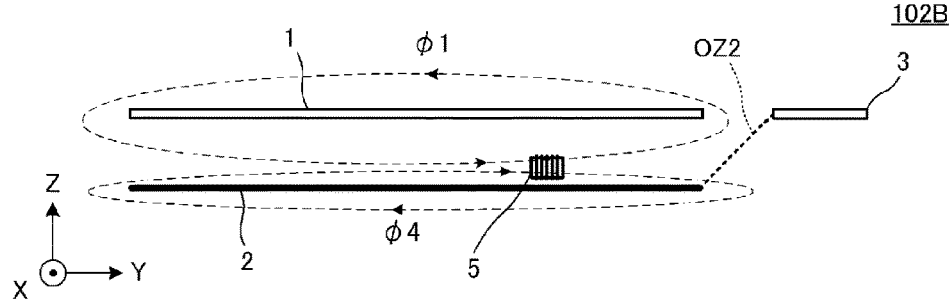
FIG. 12C is a conceptual diagram showing the magnetic flux φ1 and φ4 generated by the power supply coil.

FIG. 12A is a chart showing the coupling coefficient between the loop and the power supply coil 5 with respect to the location of the power supply coil 5 in the antenna device 102B, FIG. 12B is a conceptual diagram showing the magnetic fluxes φ2 and φ3A generated by the power supply coil 5, and FIG. 12C is a conceptual diagram showing the magnetic flux φ1 and φ4 generated by the power supply coil 5.

As shown in FIG. 12A, as the position (the "Y Position") of the power supply coil 5 in the Y-direction is moved in the positive direction, the coupling coefficient becomes higher.

In other words, in the antenna device 102B, the coupling coefficient is able to be increased when the power supply coil 5 is closer to the third conductive member 3 than to the first conductive member 1. In other words, when viewed in the thickness direction (the Z-direction), as the area in which the power supply coil 5 overlaps the third conductive member 3 becomes larger than the area in which the power supply coil 5 overlaps the first conductive member 1, the coupling coefficient between the loop and the power supply coil 5 becomes higher. When viewed in the thickness direction (the Z-direction), the width (the length in the Y-direction) of the third conductive member 3, which has an area that is smaller than the area of the first conductive member 1, is shorter than the width (the length in the Y-direction) of the first conductive member 1 and the magnetic flux $\varphi 2$ that interlinks with the third conductive member 3 is more easily formed than the magnetic flux $\varphi 1$ that interlinks with the first conductive member 1.

As shown by comparing FIG. 6A and FIG. 12A, compared with the antenna device 101B, the antenna device 102B usually has a higher coupling coefficient between the loop and the power supply coil 5. When viewed in the winding axial direction (the Y-direction) of the power supply coil 5, a loop opening OZ2 of the antenna device 102B has a portion that overlaps the opening of the power supply coil 5 and is closer to the opening when compared with the loop opening OZ1 of the antenna device 101B.

Furthermore, when "Y Position"=about 3 mm, for example, the coupling coefficient between the loop and the power supply coil 5 becomes the largest.

On the other hand, as shown in FIG. 12A, as the position (the "Y Position") of the power supply coil 5 in the Y-direction is moved in the negative direction, the coupling coefficient between the loop and the power supply coil 5 becomes lower. The magnetic flux generated by the power supply coil 5 passes the gap 9 and defines a loop along the first conductive member 1 (the magnetic flux $\varphi 1$ in FIG. 12C). As shown in FIG. 12C, since the magnetic flux $\varphi 1$ does not interlink with the loop opening OZ2, the magnetic flux $\varphi 1$ does not contribute to the coupling between the loop and the power supply coil 5. Accordingly, the coupling coefficient between the loop and the power supply coil 5 is low. However, since the magnetic flux generated by the power supply coil 5 defines a loop along the second conductive member 2 and interlinks with the loop opening OZ2, the coupling coefficient is not zero or substantially zero.

The coupling coefficient between the loop and the power supply coil 5 is lower than that of the antenna device 102A. The reason is the area of the second main surface PS2 of the second conductive member 2 in the antenna device 102B is small and a small loop of magnetic flux (a magnetic flux $\varphi 3A$ that does not contribute to the coupling between the loop and the power supply coil 5) that does not interlink with the loop opening OZ2 is provided.

However, in the antenna device 102B, in the thickness direction (Z-direction), the second conductive member 2 is, with respect to the power supply coil 5, disposed on the side (the side below the power supply coil 5 in FIGS. 11B and 12B) opposite to the side on which the first conductive member 1 and the third conductive member 3 are disposed. Accordingly, in a case in which a magnetic flux (the magnetic flux $\varphi 3$ in FIG. 12B that defines a large loop on the lower side of the power supply coil 5) that defines a large loop and that does not interlink with the loop opening is generated, an eddy current is generated in the second conductive member 2 and the magnetic flux is cancelled out or substantially cancelled out.

Accordingly, since formation of a magnetic flux that does not interlink with the loop opening OZ2 is partially reduced and a magnetic flux that does not contribute to the coupling between the loop and the power supply coil is significantly reduced or prevented, the coupling coefficient between the loop and the power supply coil 5 is significantly increased.

As shown by comparing FIG. 10A and FIG. 12A, compared with the antenna device 102B, the antenna device 102A has a higher coupling coefficient between the loop and the power supply coil 5. In other words, when viewed in the thickness direction (the Z-direction), the configuration (antenna device 102A) in which the second main surface PS2 of the second conductive member 2 overlaps the third conductive member 3 has a higher coupling coefficient between the loop and the power supply coil 5 than the configuration (the antenna device 102B) in which the second main surface PS2 of the second conductive member 2 does not overlap the third conductive member 3. As described above, in a case in which a magnetic flux (the magnetic flux $\varphi 3$ in FIG. 12B that defines a large loop on the lower side of the power supply coil 5) that does not interlink with the loop opening is generated, an eddy current is generated in the second conductive member 2 and the magnetic flux is cancelled out or substantially cancelled out.

When viewed in the thickness direction (the Z-direction), as the area in which the second main surface PS2 of the second conductive member 2 overlaps the third conductive member 3 becomes larger, formation of a magnetic flux that does not interlink with the loop opening OZ2 is further significantly reduced or prevented and, the coupling coefficient between the loop and the power supply coil 5 is significantly increased.

Even with the above configuration, the basic configuration of the antenna device 102 is the same or substantially the same as that of the antenna device 101 according to the first preferred embodiment, and similar features and advantages as those of the antenna device 101 are provided.

Furthermore, the following further features and advantages (j) to (l) are able to be provided by the present preferred embodiment.

(j) In the antenna device 102, since the ground conductor, such as the substrate 6A, is included in the second conductive member 2, a loop defining and functioning as a magnetic field antenna is able to be easily defined.

Accordingly, since a conductor that defines a portion of the loop does not have to be formed separately, the electronic device itself is able to be made small in size, is able to be manufactured easily, and a cost thereof is able to be significantly reduced.

(k) In the antenna device 102, the second connection 52A that defines a portion of the loop is coupled adjacent to or in a vicinity of the first end portion E1 of the third conductive member 3. Furthermore, the second connection 52B that defines a portion of the loop is coupled adjacent to or in a vicinity of the second end portion E2 of the third conductive member 3. Accordingly, since the effective coil opening of the loop of the magnetic field antenna defined by the second conductive member 2, the third conductive member 3, and the second connections 52A and 52B is large and the range in which the magnetic flux is radiated (collected) is large, coupling to the antenna coil of the communication partner is facilitated. Accordingly, an antenna device with excellent communication characteristics is able to be provided by a simple configuration and without using a large antenna coil.

(l) In the antenna device 102, since the second connections 52A and 52B are provided by reactance elements, the loop is able to be easily configured as an LC resonant circuit in the HF band.

In the present preferred embodiment, while the reactance elements are coupled between the second conductive member 2 and the third conductive member 3 with the connection conductors and the contact pins interposed therebetween, the reactance elements may be directly coupled between the second conductive member 2 and the third conductive member 3, for example.

Furthermore, while an example of the antenna device 102 in which the second connection 52A includes a single reactance element (the inductor L11), and the second connection 52B includes a single reactance element (the capacitor C11) has been provided, the configuration of the present preferred embodiment is not limited to the above configuration. The second connection may be an LC circuit including a plurality of reactance elements, for example. In the above case, the plurality of reactance elements may be a series LC circuit in which a plurality of reactance elements are coupled in series, or may be a parallel LC circuit in which a plurality of reactance elements are coupled in parallel, for example. Furthermore, the second connection may be a combination of a series LC circuit and a parallel LC circuit, for example.

Third Preferred Embodiment

Figure 13A:
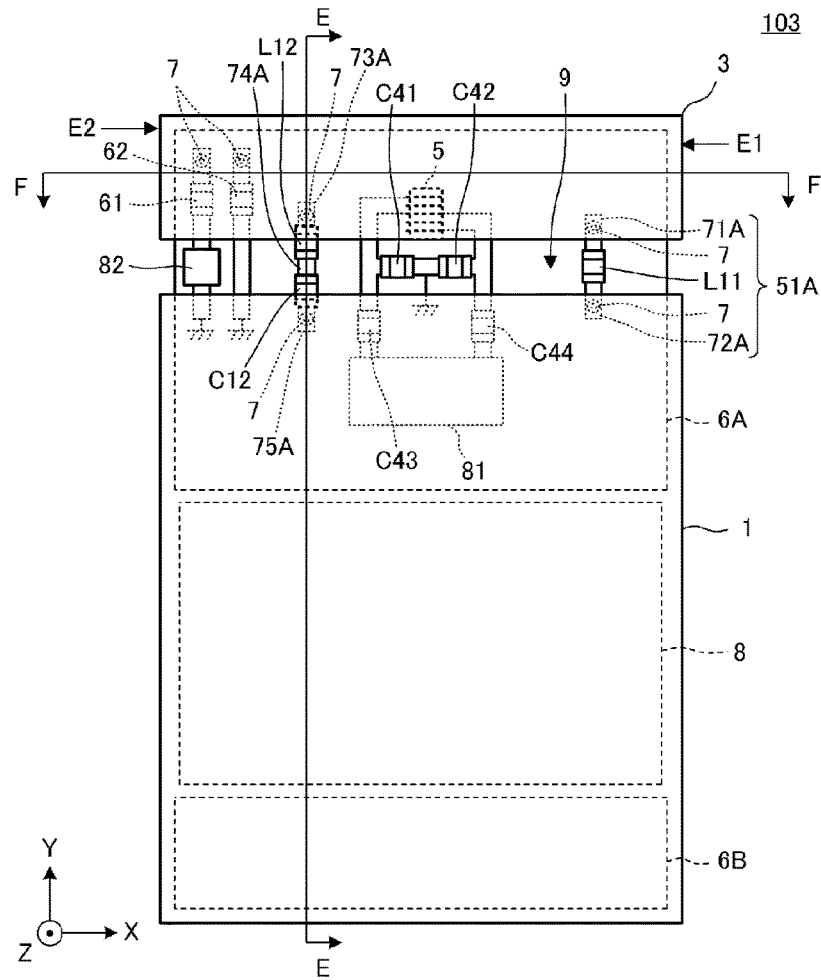
FIG. 13A is a plan view of an antenna device according to a third preferred embodiment of the present invention.
Figure 13B:
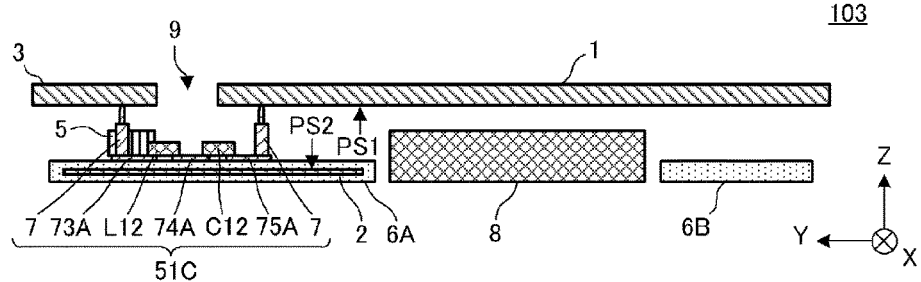
FIG. 13B is a cross-sectional view taken along line E-E in FIG. 13A.
Figure 13C:
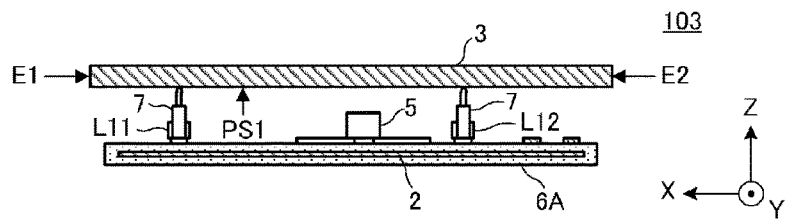
FIG. 13C is a cross-sectional view taken along line F-F in FIG. 13A.
Figure 14:
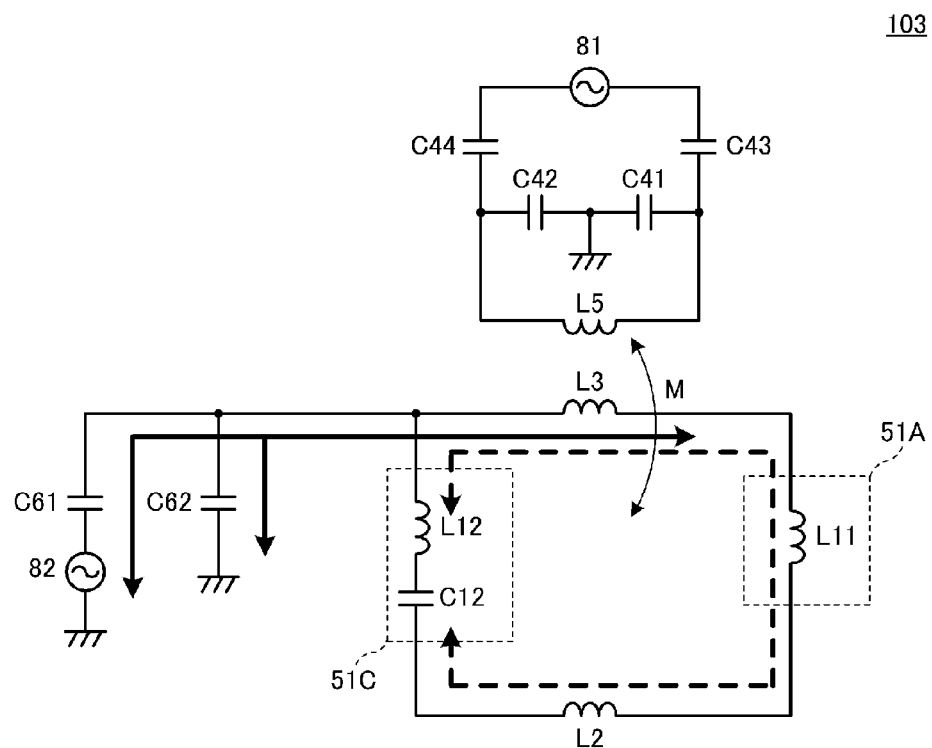
FIG. 14 is an equivalent circuit of lumped elements in the antenna device shown in FIGS. 13A to 13C.

FIG. 13A is a plan view of an antenna device 103 according to a third preferred embodiment of the present invention, FIG. 13B is a cross-sectional view taken along line E-E in FIG. 13A, and FIG. 13C is a cross-sectional view taken along line F-F in FIG. 13A. FIG. 14 is an equivalent circuit of lumped elements in the antenna device 103.

The antenna device 103 according to the third preferred embodiment is different from the antenna device 101 in that the antenna device 103 further includes a second power supply circuit 82 and reactance elements 61 and 62. Furthermore, the antenna device 103 is different from the antenna device 101 in that in place of the first connection 51B, the antenna device 103 includes a first connection 51C that defines an LC series resonant circuit. Other configurations of the antenna device 103 are the same or substantially the same as those of the antenna device 101 according to the first preferred embodiment.

The second power supply circuit 82 and the reactance elements 61 and 62 are mounted on the main surface of the substrate 6A.

The second power supply circuit 82 is an IC for the UHF (ultra high frequency) band or the SHF (super high frequency) band (a second frequency band). An input/output portion of the second power supply circuit 82 is coupled adjacent to or in a vicinity of the second end portion E2 of the third conductive member 3 in the longitudinal direction with the connection conductor, the contact pin 7, and a reactance element 61, which are provided on the main surface of the substrate 6A, interposed therebetween. The reactance element 61 is, for example, an electronic component, such as a chip capacitor, and the second power supply circuit 82 is, for example, a power supply circuit of a 2.4 GHz band wireless LAN communication system.

The connection between the third conductive member 3 including the reactance element 62 and the ground is a stub that matches the antenna including the third conductive member 3 and the first power supply circuit 81 with another communication system, and the reactance element 62 is coupled adjacent to or in a vicinity of the second end portion E2 of the third conductive member 3 with the connection conductor and the contact pin 7, which are provided on the main surface of the substrate 6A, interposed therebetween. The reactance element 62 is an electronic component such as, for example, a chip capacitor. A plurality of reactance elements 62 may be provided, for example. However, the reactance element 62 is not an essential component and the stub may be omitted, for example.

Figure 15:
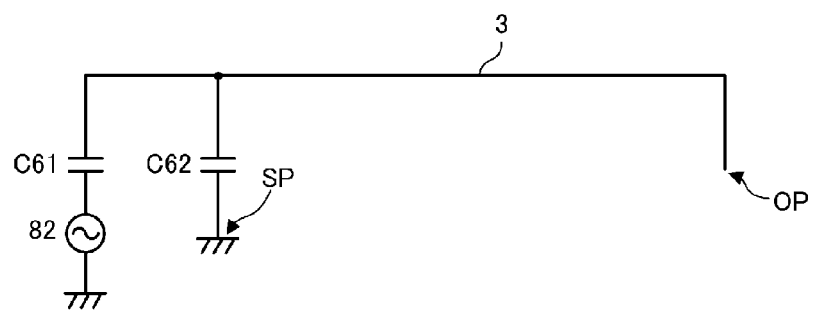
FIG. 15 is an equivalent circuit diagram of the antenna device shown in FIGS. 13A to 13C operating in the UHF band or the SHF band.

FIG. 15 is an equivalent circuit diagram of the antenna device 103 operating in the UHF band or the SHF band. In FIG. 15, the reactance elements 61 and 62 are denoted as capacitors C61 and C62.

In the UHF band or the SHF band (the second frequency band), the capacitor C62 has a low impedance and is equivalently short-circuited. Accordingly, as shown by a grounding end SP in FIG. 15, the third conductive member 3 is grounded at a predetermined position. In the UHF band or the SHF band (the second frequency band), the inductor L11 has a relatively high impedance and is equivalently open. Accordingly, as shown by an open end OP in FIG. 15, one end of the third conductive member 3 is open.

A connection point of the third conductive member 3 defines and functions as a feeding point, and the second power supply circuit 82 feeds a voltage. In the UHF band or the SHF band (the second frequency band), the third conductive member 3 resonates so that the current intensity of the open end OP of the third conductive member 3 is zero or substantially zero, and the voltage strength of grounding end SP is zero or substantially zero. In other words, the length and the like of the third conductive member 3 is set to resonate in the UHF band or the SHF band. The third conductive member 3 resonates in a basic mode at low band in the frequency band of about 700 MHz to about 2.4 GHz, and resonates in a higher order mode at high band. Accordingly, in the UHF band or the SHF band (the second frequency band), the electric current flows through a path indicated by a broken line arrow in FIG. 14.

In the implementation described above, in the UHF band or the SHF band (the second frequency band), the third conductive member 3 defines and functions as a standing-wave inverted-F antenna (a radiation element) that contributes to electromagnetic wave radiation, and the resonance thereof generates a standing wave with current intensity and voltage strength. While an inverted-F antenna is described herein, other standing wave antennas, which generate a standing wave with current intensity and voltage strength by resonating on a radiation element (the third conductive member 3), such as a patch antenna including a monopole antenna, a one-wavelength loop antenna, an inverted-L antenna, and a plate inverted-F antenna (PIFA), a slot antenna, a notch antenna may also be applied, for example.

In the HF band (the first frequency band), the reactance elements 61 and 62 have high impedance, and the second power supply circuit 82 is not equivalently connected. Accordingly, the second power supply circuit 82 does not or substantially does not affect the communication in the HF band. Furthermore, in the UHF band or the SHF band (the second frequency band), the inductor L11 has high impedance and the inductor L11 is not equivalently connected. Accordingly, since the loop including the inductor L11 is open, no communication signal in the UHF band or the SHF band flows in the first power supply circuit 81 and the first power supply circuit 81 does not or substantially does not affect the communication in the UHF band or the SHF band.

The first connection 51C includes an inductor L12, a capacitor C12, connection conductors 73A, 74A, and 75A, and contact pins 7, and is coupled between the first conductive member 1 and the third conductive member 3. Specifically, a first end of the inductor L12 is coupled adjacent to or in a vicinity of the second end portion E2 of the third conductive member 3 with the connection conductor 73A and the contact pin 7 interposed therebetween, and a second end of the inductor L12 is coupled to a first end of the capacitor C12 with the connection conductor 74A interposed therebetween. A second end of the capacitor C12 is coupled to the first conductive member 1 with the connection conductor 75A and the contact pin 7 interposed therebetween. The inductor L12 and the capacitor C12 are mounted on the main surface of the substrate 6A. The connection conductor 75A is a straight or substantially straight (I-shaped) conductive pattern provided on the main surface of the substrate 6A.

As described above, in the first connection 51C, the inductor L12 and the capacitor C12 are serially coupled to each other and define an LC series resonant circuit. In the HF band (the first frequency band), the resonant frequency of the LC series resonant circuit described above has a capacitance for the loop to resonate, or has a low impedance at or around the resonance point. In the UHF band or the SHF band (the second frequency band), the resonant frequency has a relatively high inductive impedance. With the above configuration, in the UHF band or the SHF band (the second frequency band), since the electric current is interrupted at the LC series resonant circuit, the electric current does not flow in the first conductive member 1, and the electric current flows in the third conductive member 3, and a standing wave is generated on the third conductive member 3. Furthermore, in the HF band (the first frequency band), the electric current flows in the LC series resonant circuit, and the first conductive member 1 and the third conductive member define and function as conductive members defining a loop.

With the above configuration, the loop of the magnetic field antenna defines and functions as the antenna operating in the HF band (the first frequency band), and the radiation element of the standing wave antenna defines and functions as an antenna operating in the UHF band or the SHF band (the second frequency band). Accordingly, an antenna device that includes a loop of the magnetic field antenna and a radiation element of a standing wave antenna, and that is able to be included in a plurality of systems operating in different frequency bands is able to be provided. Furthermore, an electronic device with the antenna device 103 that is able to be included in a plurality of systems operating in different frequency bands is able to be provided.

In the preferred embodiment described above, in a case in which the first connection is provided by a single capacitor (a reactance element), in the UHF band or the SHF band (the second frequency band), the first connection will have a low impedance, and the electric current will flow in the first conductive member 1 via the first connection. Because of the above, there is a concern that the first conductive member 1 may operate as an unneeded radiation element in the UHF band or the SHF band (the second frequency band). Meanwhile, in the present preferred embodiment, since the first connection 51C defines the LC series resonant circuit, in the UHF band or the SHF band (the second frequency band), the first connection 51C has a relatively high impedance, and the electric current flowing to the first conductive member 1 is interrupted. As described above, compared with a case in which the first connection includes a single capacitor (a reactance element), the present preferred embodiment is able to reliably cut off the third conductive member 3 from the loop in the UHF band or the SHF band (the second frequency band). Accordingly, by providing the first connection 51C with the LC series resonant circuit, it will be easier to design (the width, the length, and the like of the radiation element) the third conductive member 3 to define and function as a radiation element of a standing wave antenna.

In the present preferred embodiment, while an example in which the first connection 51A is coupled adjacent to or in a vicinity of the first end portion E1 in the longitudinal direction of the third conductive member 3, and the first connection 51C is coupled adjacent to or in a vicinity of the second end portion E2 in the longitudinal direction of the third conductive member 3 has been provided, the configuration of the present preferred embodiment is not limited to the above configuration. The first connection 51A may be coupled adjacent to or in a vicinity of the second end portion E2 in the longitudinal direction of the third conductive member 3, and the first connection 51C may be coupled adjacent to or in a vicinity of the first end portion E1 in the longitudinal direction of the third conductive member 3, for example. In other words, as long as a loop is able to be provided, the location of the first connection (a conductor, a circuit, or a reactance element) coupled adjacent to or in a vicinity of the first end portion E1 in the longitudinal direction of the third conductive member 3, and the location of the first connection (a conductor, a circuit, or a reactance element) coupled adjacent to or in a vicinity of the second end portion E2 are able to be exchanged with one another. However, in a case in which the location of the first connection coupled adjacent to or in a vicinity of the first end portion E1 in the longitudinal direction of the third conductive member 3, and the location of the first connection coupled adjacent to or in a vicinity of the second end portion E2 are changed, the antenna characteristics of the standing wave antenna will change.

Fourth Preferred Embodiment

Figure 16A:
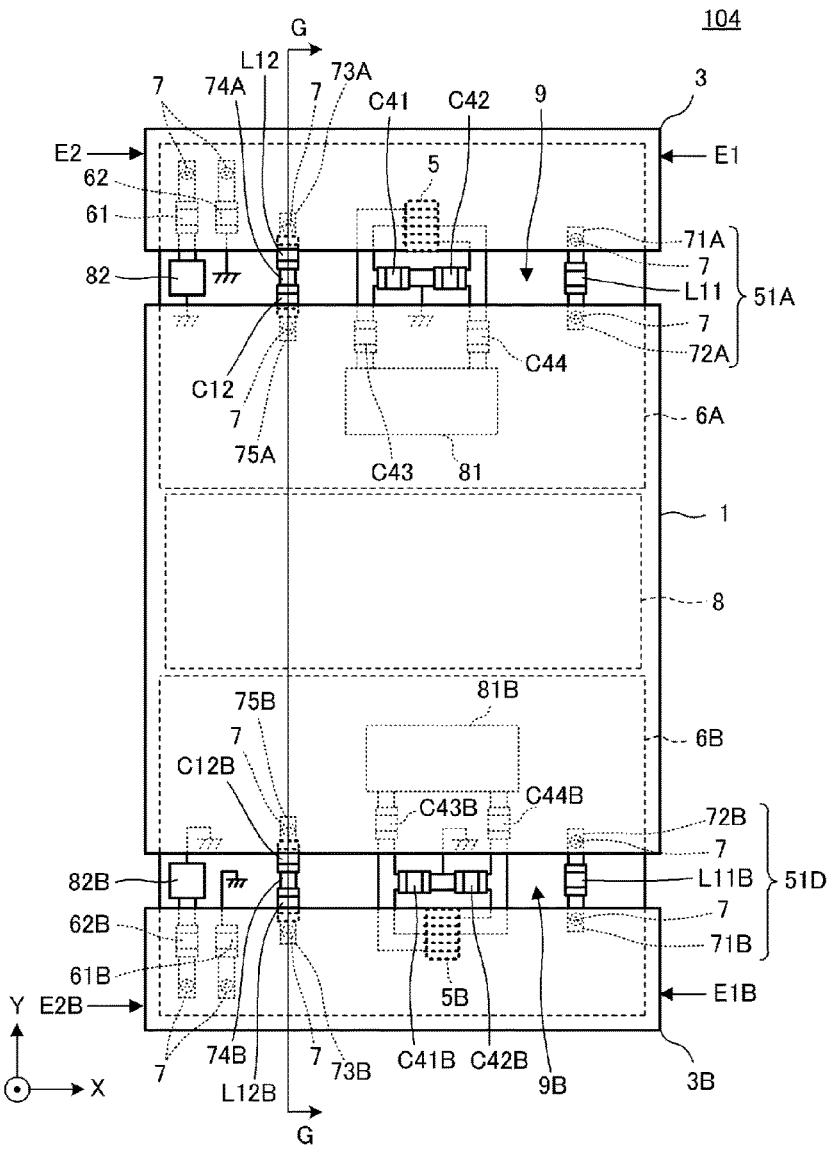
FIG. 16A is a plan view of an antenna device according to a fourth preferred embodiment of the present invention.
Figure 16B:
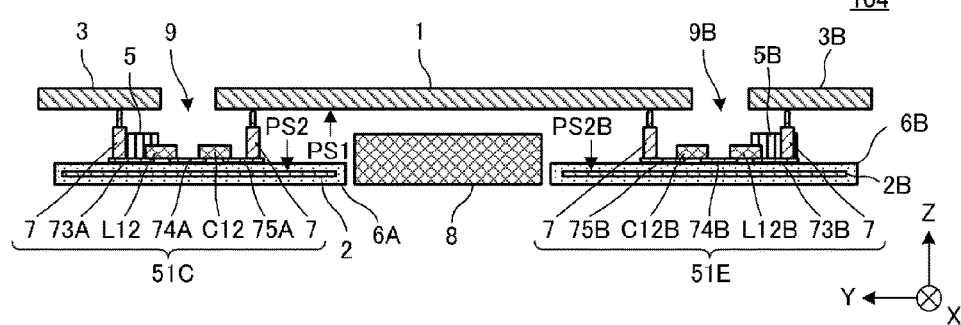
FIG. 16B is a cross-sectional view taken along line G-G in FIG. 16A.

FIG. 16A is a plan view of an antenna device 104 according to a fourth preferred embodiment of the present invention, and FIG. 16B is a cross-sectional view taken along line G-G in FIG. 16A.

The antenna device 104 according to the fourth preferred embodiment is different from the antenna device 103 according to the third preferred embodiment in that the antenna device 104 further includes a third conductive member 3B, first connections 51D and 51E, a power supply coil 5B, a first power supply circuit 81B, a second power supply circuit 82B, reactance elements 61B and 62B, and capacitors C41B, C42B, C43B, and C44B. Other configurations of the antenna device 104 are the same or substantially the same as those of the antenna device 103 according to the third preferred embodiment. In other words, the present preferred embodiment includes a configuration in which two antenna devices 103 are included in the short direction (the Y-direction in FIG. 16A) of the substrate 6A as upper and lower antennas that are symmetrical or substantially symmetrical.

The first connections 51D and 51E, the first power supply circuit 81B, the second power supply circuit 82B, the reactance elements 61B and 62B, and the capacitors C41B to C44B are mounted on the main surface of the substrate 6B.

The third conductive member 3B is a rectangular flat or substantially rectangular flat plate. The longitudinal direction of the third conductive member 3B coincides with a crosswise direction (an X-direction in FIG. 16A), and the third conductive member 3B includes a first end portion E1B and a second end portion E2B. As shown in FIG. 16A, when viewed in the thickness direction (the Z-direction), that area of the third conductive member 3B is smaller than that of the first conductive member 1.

The first conductive member 1 and the third conductive member 3B according to the present preferred embodiment are arranged in the lengthwise direction (the Y-direction) and are disposed on the same or substantially the same plane with a gap 9B in between (see FIG. 16B). Accordingly, as shown in FIG. 16A, the first conductive member 1 and the third conductive member 3B do not overlap each other when viewed in the thickness direction (Z-direction).

The substrate 6B includes a tabular second conductive member 2B located therein. The second conductive member 2B is a ground conductor provided on an entire or substantially an entire main surface of the substrate 6B, and includes a second main surface PS2B (a surface on the upper side of the second conductive member 2B in FIG. 16 B). As shown in FIG. 16B, the second main surface PS2B is disposed so that at least a portion thereof opposes the first main surface PS1 of the first conductive member 1. Furthermore, when viewed in the thickness direction (Z-direction), at least a portion of the second main surface PS2B overlaps the third conductive member 3B.

The first connection 51D includes an inductor L11B, connection conductors 71B and 72B, and contact pins 7, and is coupled between the first conductive member 1 and the third conductive member 3B. Specifically, a first end of the inductor L11B is coupled adjacent to or in a vicinity of the first end portion E1B of the third conductive member 3B with the connection conductor 71B and the contact pin 7 interposed therebetween, and a second end of the inductor L11B is coupled to the first conductive member 1 with the connection conductor 72B and the contact pin 7 interposed therebetween. The inductor L11B is mounted on the main surface of the substrate 6A. The connection conductors 71B and 72B are straight or substantially straight (I-shaped) conductive patterns provided on the main surface of the substrate 6B.

The first connection 51E includes an inductor L12B, a capacitor C12B, connection conductors 73B, 74B, and 75B, and contact pins 7, and is coupled between the first conductive member 1 and the third conductive member 3B. Specifically, a first end of the inductor L12B is coupled adjacent to or in a vicinity of the second end portion E2B of the third conductive member 3B with the connection conductor 73B and the contact pin 7 interposed therebetween, and a second end of the inductor L12B is coupled to a first end of the capacitor C12B with the connection conductor 74B interposed therebetween. A second end of the capacitor C12B is coupled to the first conductive member 1 with the connection conductor 75B and the contact pin 7 interposed therebetween. The inductor L12B and the capacitor C12B are mounted on the main surface of the substrate 6B. The connection conductors 73B, 74B, and 75B are straight or substantially straight (I-shaped) conductive patterns provided on the main surface of the substrate 6B.

As described above, in the first connection 51E, the inductor L12B and the capacitor C12B are serially coupled to each other and define an LC series resonant circuit. In the HF band (the first frequency band), the resonant frequency of the LC series resonant circuit described above is set to have a capacitance for the loop to resonate, or to have a low impedance at or around the resonance point. In the UHF band or the SHF band (the second frequency band), the resonant frequency is set to have a relatively high inductive impedance. With the above configuration, in the UHF band or the SHF band (the second frequency band), since the electric current is interrupted at the LC series resonant circuit, the electric current does not flow in the first conductive member 1, and the electric current flows in the third conductive member 3, and a standing wave is generated on the third conductive member 3. Furthermore, in the HF band (the second frequency band), the electric current flows in the LC series resonant circuit, and the first conductive member 1 and the third conductive member define and function as conductive members defining a loop.

As shown in FIG. 16A, the first conductive member 1, the third conductive member 3B, and the first connections 51D and 51E define another loop.

The first power supply circuit 81B is a balanced input/output type HF band (a first frequency band) IC. Input/output portions of the first power supply circuit 81B are coupled to the power supply coil 5B with the capacitors C41B to C44B interposed therebetween. A series circuit of the capacitors C41B and C42B is serially coupled to the power supply coil 5B, and an LC resonant circuit is provided. The first power supply circuit 81B feeds a communication signal in the HF band to the LC resonant circuit with the capacitors C43B and C44B interposed therebetween. The first power supply circuit 81B is, for example, an RFIC element for about 13.56 MHz RFID, and the power supply coil 5B is, for example, a laminated ferrite chip antenna in which a coil-shaped conductor is wound around a magnetic ferrite core.

The power supply coil 5B described above is magnetically coupled or electromagnetically coupled (magnetically coupled and electric-field coupled) to the loop defined by the first conductive member 1, the third conductive member 3B, and the first connections 51D and 51E.

Specifically, the power supply coil 5B is disposed between the plane (the XY-plane) including the first main surface PS1 of the first conductive member 1, and the plane (the XY-plane) including the second main surface PS2 of the second conductive member 2. Furthermore, the power supply coil 5B is disposed, when viewed in the thickness direction (the Z-direction), at the middle of the third conductive member 3B in the longitudinal direction, and along an edge portion of the third conductive member 3B located where a coil opening faces the gap 9B. In other words, the power supply coil 5B is disposed in an orientation interlinking the magnetic flux passing through the power supply coil 5B and the loop to each other. Accordingly, the power supply coil 5B is primarily magnetically coupled to the loop (particularly, the third conductive member 3B).

Furthermore, as shown in FIG. 16B, when viewed in the thickness direction (the Z-direction), the entire power supply coil 5B overlaps the third conductive member 3B, and is disposed between the second conductive member 2B and the third conductive member 3B. In other words, when viewed in the thickness direction (the Z-direction), the power supply coil 5B is closer to the third conductive member 3B than to the first conductive member 1. Accordingly, the power supply coil 5B is not only magnetically coupled to the third conductive member but is also electromagnetically coupled, which includes electric-field coupling, to the third conductive member.

The second power supply circuit 82B is an IC for UHF band or SHF band (the second frequency band). An input/output portion of the second power supply circuit 82B is coupled adjacent to or in a vicinity of the second end portion E2B of the third conductive member 3B in the longitudinal direction with the connection conductor, the contact pin 7, and the reactance element 61B, which are provided on the main surface of the substrate 6B, interposed therebetween. The second power supply circuit 82B is a power supply circuit of a GPS communication system for about 1.5 GHz band, for example.

The reactance element 62B is an element provided to match the second power supply circuit 82B with another communication system, and is coupled adjacent to or in a vicinity of the second end portion E2B in the longitudinal direction of the third conductive member 3B with the connection conductor and the contact pin 7, which are provided on the main surface of the substrate 6B, interposed therebetween.

With the structure described above, in the UHF band or the SHF band (the second frequency band), the third conductive member 3B defines and functions as a standing-wave inverted-F antenna that contributes to electromagnetic wave radiation, and the resonance thereof generates a standing wave with current intensity and voltage strength.

With the above configuration, a communication terminal that includes two antenna devices, which are able to be included in a plurality of systems operating in different frequency bands, provided in the lengthwise direction (the Y-direction in FIG. 16A is able to be provided.

While the present preferred embodiment provides an example in which the first conductive member 1 and the third conductive members 3 and 3B are flush with each other (on the same or substantially the same height in the Z-direction), the configuration of the present preferred embodiment is not limited to the above configuration. The relationship in height in the Z-direction between the first conductive member 1 and the third conductive members 3 and 3B is able to be appropriately changed within the range in which the features and advantages of having the third conductive members 3 and 3B defining functioning as standing wave antennas and a loop defining and functioning as a magnetic field antenna are able to be provided. The directivity of the antenna is able to be changed by changing the relationship in height in the Z-direction between the first conductive member 1 and the third conductive members 3 and 3B.

As shown in FIG. 16A, an example of the antenna device 104 according to the present preferred embodiment in which, when viewed in the thickness direction (the Z-direction), the third conductive member 3, the first conductive member 1, and the third conductive member 3B are arranged in the lengthwise direction (the Y-direction) has been provided. However, the configuration of the antenna device 104 is not limited to the above configuration. The location of the third conductive member 3, the first conductive member 1, and the third conductive member 3B is able to be appropriately changed.

Furthermore, an example of the antenna device 104 according to the present preferred embodiment including two radiation elements (the third conductive members 3 and 3B) that are standing wave antennas has been provided. However, the configuration of the present preferred embodiment is not limited to the above configuration. The number and the like of the radiation elements (the third conductive members) are able to be appropriately changed.

While the present preferred embodiment provides an example in which the first conductive member 1, the third conductive members 3 and 3B, and the like define a plurality of loops, the configuration of the present preferred embodiment is not limited to the above. The second conductive member, the third conductive members 3 and 3B, and the like may define a plurality of loops.

Fifth Preferred Embodiment

Figure 17A:
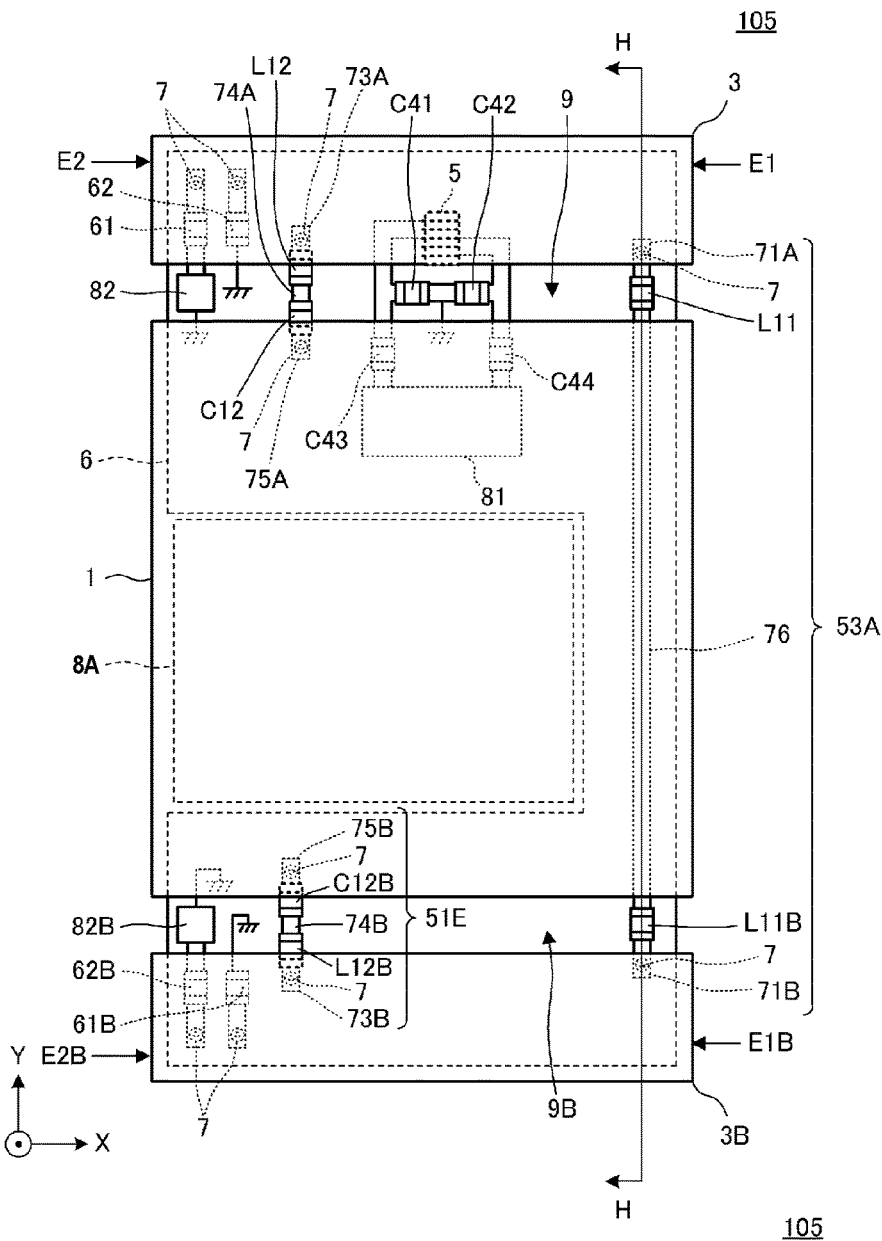
FIG. 17A is a plan view of an antenna device according to a fifth preferred embodiment of the present invention.
Figure 17B:
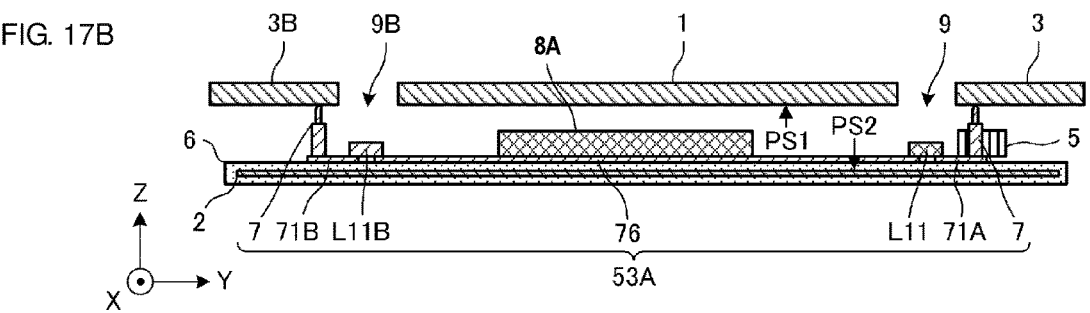
FIG. 17B is a cross-sectional view taken along line H-H in FIG. 17A.

FIG. 17A is a plan view of an antenna device 105 according to a fifth preferred embodiment of the present invention, and FIG. 17B is a cross-sectional view taken along line H-H in FIG. 17A.

The antenna device 105 according to the fifth preferred embodiment is different from the antenna device 104 according to the fourth preferred embodiment in that the antenna device 105 includes a substrate 6 instead of the substrates 6A and 6B, includes a battery pack 8A instead of the battery pack 8, and includes a third connection 53A instead of the first connections 51A and 51D. Moreover, the antenna device 105 is different in that, compared with the antenna device 104, the antenna device 105 does not include the power supply coil 5B, the first power supply circuit 81B and the capacitors C41B, C42B, C43B, and C44B. Other configurations of the antenna device 105 are the same or substantially the same as those of the antenna device 104 according to the fourth preferred embodiment.

In the present preferred embodiment, the power supply coil 5, the first connections 51C and 51E, a third connection 53A, the first power supply circuits 81, the second power supply circuit 82 and 82B, the reactance elements 61, 62, 61B, and 62B, and the capacitors C41 to C44, and C41B to C44B are mounted on the main surface of the substrate 6.

The substrate 6 is a U-shaped (a C-shaped) flat or substantially U-shaped (C-shaped) flat insulating plate. The battery pack 8A is disposed in a cavity of the substrate 6. The substrate 6 and the battery pack 8A are disposed on the same or substantially the same plane (see FIG. 17B).

The substrate 6 includes a tabular second conductive member 2 located therein. The second conductive member 2 is a ground conductor provided on an entire or substantially an entire main surface of the substrate 6, and includes a second main surface PS2 (a surface on the upper side of the second conductive member 2 in FIG. 17 B).

The third connection 53A includes the inductors L11 and L11B, the connection conductors 71A and 71B, a connection conductor 76, and the contact pins 7, and is coupled between the third conductive member 3 and the third conductive member 3B. Specifically, the first end of the inductor L11 is coupled adjacent to or in a vicinity of the first end portion E1 of the third conductive member 3 with the connection conductor 71A and the contact pin 7 interposed therebetween, and the second end of the inductor L11 is coupled to the first end of the inductor L11B with the connection conductor 76 interposed therebetween. The second end of the inductor L11B is coupled adjacent to or in a vicinity of the first end portion E1B of the third conductive member 3B with the connection conductor 71B and the contact pin 7 interposed therebetween. The inductors L11 and L11B are inductor components such as, for example, chip inductors, and are mounted on the main surface of the substrate 6. The connection conductors 71A, 71B, and 76 are straight or substantially straight (I-shaped) conductive patterns provided on the main surface of the substrate 6. As described above, in the third connection 53A, the inductors L11 and L11B are serially coupled to each other.

As shown in FIG. 17A, in the antenna device 105 of the present preferred embodiment, the first conductive member 1, the third conductive members 3 and 3B, the first connections 51C and 51E, and the third connection 53A define a loop.

The power supply coil 5 is magnetically coupled or electromagnetically coupled to a large loop defined by the first conductive member 1, the third conductive members 3 and 3B, the first connections 51C and 51E, and the third connection 53A.

With such a structure, a communication terminal that includes an antenna device that is able to be included in a plurality of systems operating in different frequency bands is able to be provided.

Furthermore, with the above structure, the effective coil opening that defines and functions as an antenna is larger, and the range and distance of the magnetic flux that is radiated (collected) is larger and coupling to the antenna coil of the communication partner is facilitated.

The first connection is not limited to a configuration in which the first connection is coupled between the first conductive member 1 and the third conductive members 3 and 3B. If a loop is to be provided, as described in the present preferred embodiment, the first connection may be coupled between the third conductive member 3 and the third conductive member 3B, for example.

In the present preferred embodiment, an example in which the inductor L11 and the inductor L11B are coupled to each other with the connection conductor 76 provided on the main surface of the substrate 6 interposed therebetween has been provided. However, the configuration of the inductor L11 and the inductor L11B is not limited to the above configuration. Instead of the connection conductor provided on the main surface of the substrate 6, a wire or the like may directly couple the inductor L11 and the inductor L11B to each other. Alternatively, the entirety of the first connection (or the second connection) may be a piece of wire or the like, for example. In other words, the first conductive member 1 and the third conductive member 3 (or the first conductive member 1 and the second conductive member 2) may be directly coupled to each other with a piece of wire or the like, for example.

Sixth Preferred Embodiment

Figure 18:
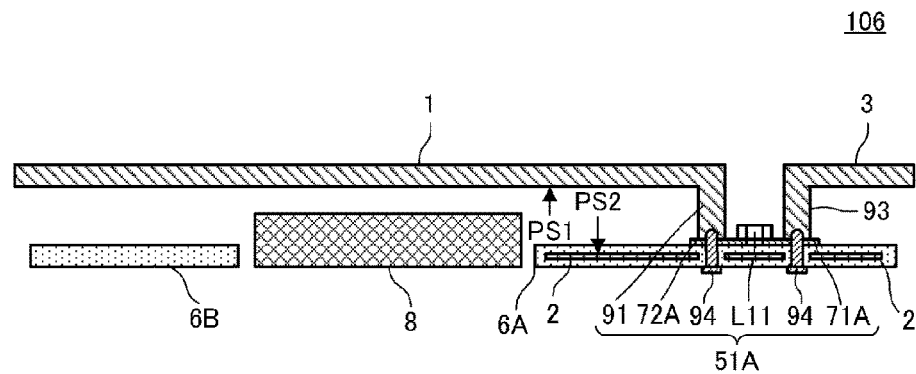
FIG. 18 is a cross-sectional view of an antenna device according to a sixth preferred embodiment of the present invention.

FIG. 18 is a cross-sectional view of an antenna device 106 according to a sixth preferred embodiment of the present invention.

The antenna device 106 according to the sixth preferred embodiment is different from the antenna device 101 according to the first preferred embodiment in that the antenna device 106 does not include any contact pins. Other configurations of the antenna device 106 are the same or substantially the same as those of the antenna device 101 according to the first preferred embodiment.

The antenna device 106 includes, as a substitute for the contact pins, conductive connections 91 and 93 and screw members 94. The conductive connection 91 is a portion of the first conductive member 1 that has been partially bent, and the conductive connection 93 is a portion of the third conductive member 3 that has been partially bent.

The conductive connections 91 and 93 are fixed to the substrate 6A by the screw members 94. The third conductive member 3 is coupled to the first end of the inductor L11 with the conductive connection 93 and the connection conductor 71A interposed therebetween. Furthermore, the first conductive member 1 is coupled to the second end of the inductor L11 with the conductive connection 91 and the connection conductor 72A interposed therebetween.

As shown in FIG. 18, the inductor L11, the conductive connections 91 and 93, and the connection conductors 71A and 72A define the first connection 51A.

As described above, the portions in the antenna device 101 according to the first preferred embodiment coupled through the contact pins may be coupled with the conductive connections 91 and 93 and the screw members 94, for example. In the present preferred embodiment, while an example in which the conductive connection 91 is a portion of the first conductive member 1 that has been partially bent, and the conductive connection 93 is a portion of the third conductive member 3 that has been partially bent has been provided, the configuration of the connections 91 and 93 is not limited to the above configuration. The shapes of the conductive connections 91 and 93 may be appropriately changed in the range that provides magnetic coupling or electromagnetic coupling of the power supply coil to the loop, for example. Accordingly, the conductive connections 91 and 93 may be members that have conductivity that is different from that of the first conductive member 1 and the third conductive member 3, for example. In the above case, the conductive connections 91 and 93 may be coupled to the first conductive member 1 and the third conductive member 3 with the screw members, or may be coupled to the first conductive member 1 and the third conductive member 3 with conductive adhesive, for example.

Furthermore, in the present preferred embodiment, an example in which the conductive connections 91 and 93 are fixed to the substrate 6A through the screw members 94 has been provided. However, the structure of the conductive connections 91 and 93 is not limited to the above configuration. The conductive connections 91 and 93 may be fixed to the substrate 6A through the conductive adhesive without using the screw members 94, for example.

Moreover, a conductor pattern provided on a flexible printed board, and the connection conductor provided on the substrate 6A may be coupled to each other by fixing the flexible printed board to the substrate 6A without using the connection conductors 71A and 72A, for example.

Seventh Preferred Embodiment

Figure 19A:
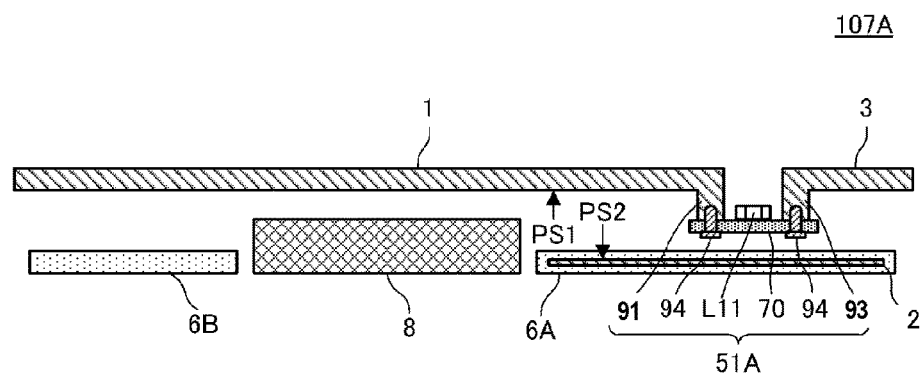
FIG. 19A is a cross-sectional view of an antenna device according to a seventh preferred embodiment of the present invention.
Figure 19B:
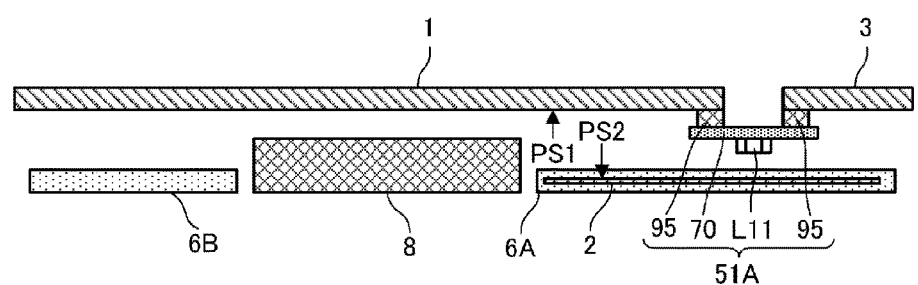
FIG. 19B is a cross-sectional of an antenna device.

FIG. 19A is a cross-sectional view of an antenna device 107A according to a seventh preferred embodiment of the present invention, and FIG. 19B is a cross-sectional of an antenna device 107B.

The antenna devices 107A and 107B according to the seventh preferred embodiment are different from the antenna device 106 according to the sixth preferred embodiment in that the inductor L11 of the first connection 51A is not mounted on the substrate 6A. Other configurations of the antenna devices 107A and 107B are the same or substantially the same as those of the antenna device 106.

The antenna device 107A further includes the conductive connections 91 and 93, the screw members 94, and a wiring substrate 70. A conductor pattern (not shown) is provided on a first main surface (an upper surface in FIG. 19(A)) of the wiring substrate 70. The wiring substrate 70 is, for example, is a flexible printed board (flexible printed circuit board).

The wiring substrate 70 is electrically connected to the first conductive member 1 through the conductive connection 91 and the screw member 94. Furthermore, the wiring substrate 70 is electrically connected to the third conductive member 3 through the conductive connection 93 and the screw member 94. The third conductive member 3 is coupled to the first end of the inductor L11 with the conductor pattern provided on the first main surface of the wiring substrate 70 and the conductive connection 93 interposed therebetween. The first conductive member 1 is coupled to the second end of the inductor L11 with the conductor pattern provided on the first main surface of the wiring substrate 70 and the conductive connection 91 interposed therebetween.

As shown in FIG. 19A, in the antenna device 107A, the inductor L11, the conductive connections 91 and 93, the screw members 94, and the wiring substrate 70 (the conductor pattern) define the first connection 51A.

The antenna device 107B further includes conductive adhesives 95 and the wiring substrate 70. The wiring substrate 70 is electrically connected to the first conductive member 1 with the conductive adhesive 95 interposed therebetween. Furthermore, the wiring substrate 70 is electrically connected to the third conductive member 3 with the conductive adhesive 95 interposed therebetween. The third conductive member 3 is coupled to the first end of the inductor L11 with the conductor pattern provided on the first main surface of the wiring substrate 70 and the conductive adhesives 95 interposed therebetween. The first conductive member 1 is coupled to the second end of the inductor L11 with the conductor pattern provided on the first main surface of the wiring substrate 70 and the conductive adhesives 95 interposed therebetween.

As shown in FIG. 19B, in the antenna device 107B, the inductor L11, the conductive adhesives 95, and the wiring substrate 70 (the conductor pattern) define the first connection 51A.

With the above configuration, the first conductive member 1 and the substrate 6A do not need to be coupled to each other. Furthermore, the third conductive member 3 and the substrate 6A do not need to be coupled to each other.

Furthermore, since in the antenna devices 107A and 107B according to the present preferred embodiment, components such as the inductor L11 are able to be mounted on the wiring substrate 70, the mounting space of the substrate 6A is increased and the degree of freedom of the location and the like of the mounted components is able to be increased.

Moreover, while an example of the antenna device 107A according to the present preferred embodiment in which the wiring substrate 70 is fixed to the conductive connections 91 and 93 through the screw members 94 has been provided, the configuration of the antenna device 107A is not limited to the above configuration. As in the description of the antenna device 107B, the conductive adhesives 95 may be fixed to the wiring substrate 70 with the conductive adhesives 95 without using the screw members 94, for example.

Eighth Preferred Embodiment

Figure 20:
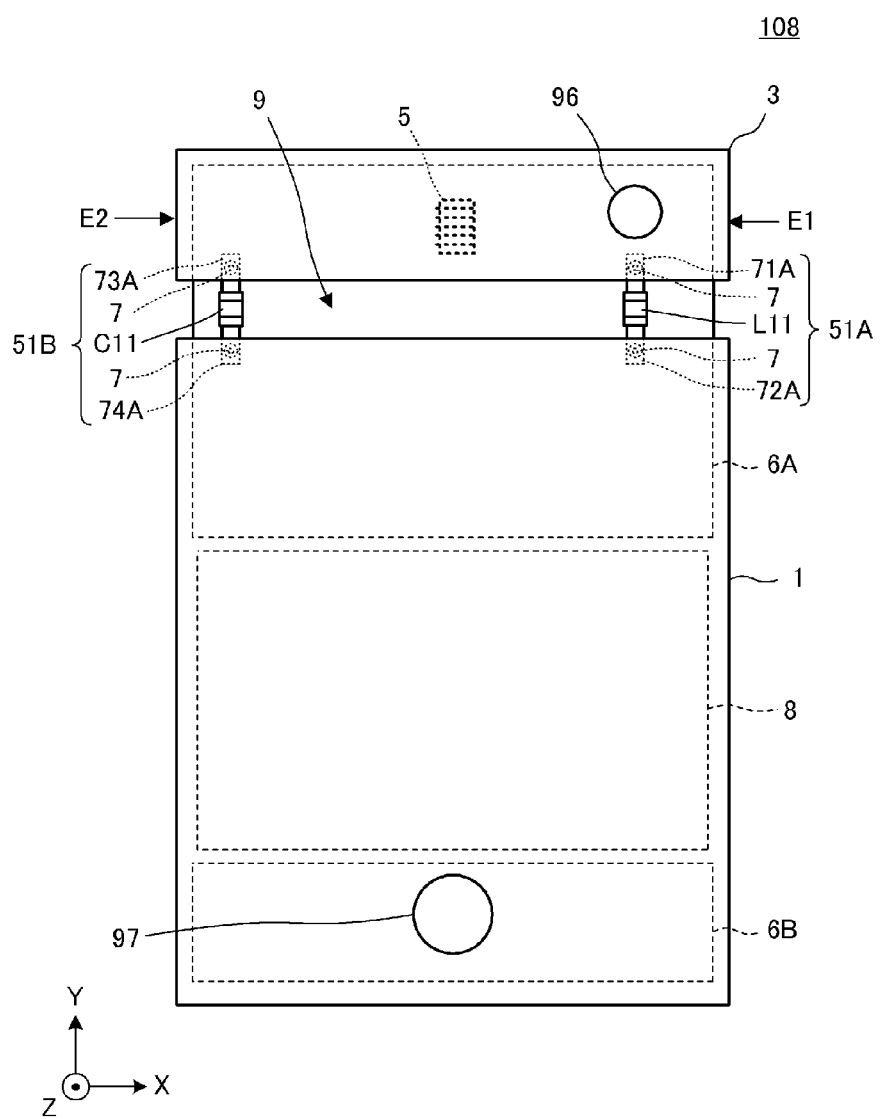
FIG. 20 is a plan view of an antenna device according to an eighth preferred embodiment of the present invention.

FIG. 20 is a plan view of an antenna device 108 according to an eighth preferred embodiment of the present invention. In FIG. 20, the first power supply circuit, the capacitor, the reactance element, and the like are omitted for clarity.

The antenna device 108 according to the eighth preferred embodiment is different from the antenna device 101 according to the first preferred embodiment in that the antenna device 108 is further provided with cavities 96 and 97. Other configurations of the antenna device 108 are the same or substantially the same as those of the antenna device 101 according to the first preferred embodiment.

In the antenna device 108, the first conductive member 1 is provided with the cavity 97 and the third conductive member 3 is provided with the cavity 96. The cavities 96 and 97 are, for example, a cavity for a camera module or a cavity for a button.

Even with the above configuration, the basic configuration of the antenna device 108 is the same or substantially the same as that of the antenna device 101 according to the first preferred embodiment, and similar features and advantages as those of the antenna device 101 are provided.

The positions, the sizes, the number, and the like of the cavities 96 and 97 described in the present preferred embodiment are only examples, and the configuration of the cavities 96 and 97 is not limited to the above configuration. The positions, the sizes, the number, and the like of the cavities 96 and 97 are able to be appropriately changed in the range in which the first conductive member and the third conductive member 3 define a loop, and define and function as a booster antenna for the power supply coil 5.

While the present preferred embodiment provides an example in which the first conductive member 1 and the third conductive member 3 define a portion of the loop, the configuration of the first conductive member 1 and the third conductive member 3 is not limited to the above. The second conductive member may be provided with a cavity, and the second conductive member and the third conductive member 3 may define a portion of the loop, for example. In the above case, the position, the size, the number, and the like of the cavity provided in the second conductive member are able to be appropriately changed in the range in which the second conductive member and the third conductive member 3 define a loop, and define and function as a booster antenna for the power supply coil 5. Furthermore, devices such as a loudspeaker and a sensor, or resin or the like that is modeled into an emblem may be disposed in the cavities 96 and 97, for example.

Ninth Preferred Embodiment

Figure 21:
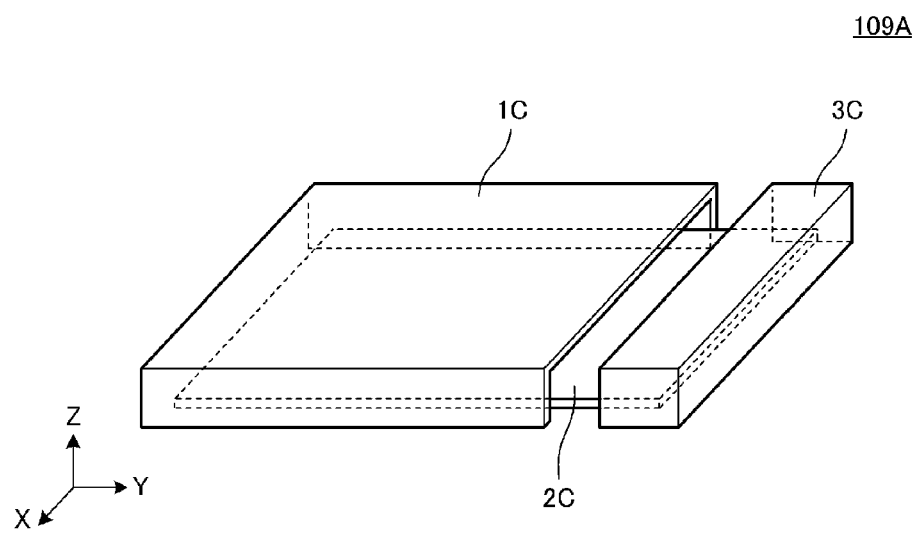
FIG. 21 is an external perspective view of a first conductive member, a second conductive member, and a third conductive member of an antenna device according to a ninth preferred embodiment of the present invention.
Figure 22:
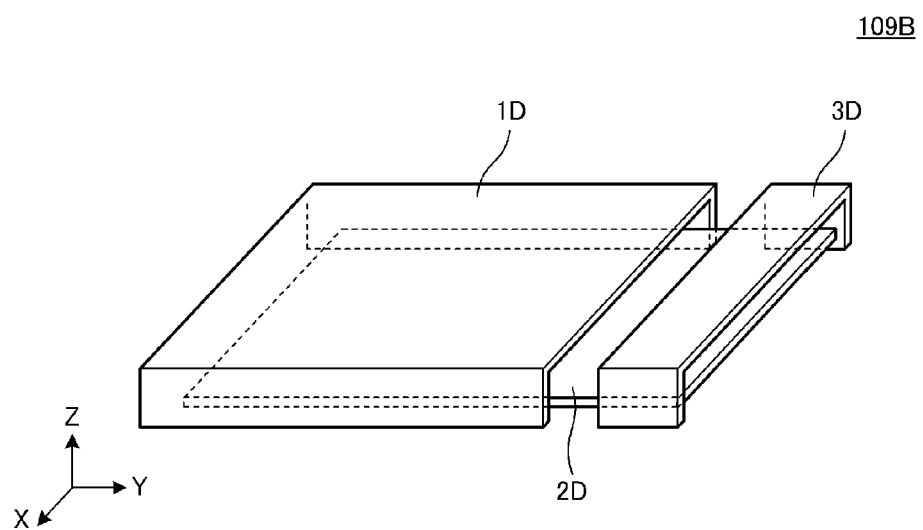
FIG. 22 is an external perspective view of a first conductive member, a second conductive member, and a third conductive member of an antenna device according to the ninth preferred embodiment of the present invention.
Figure 23:
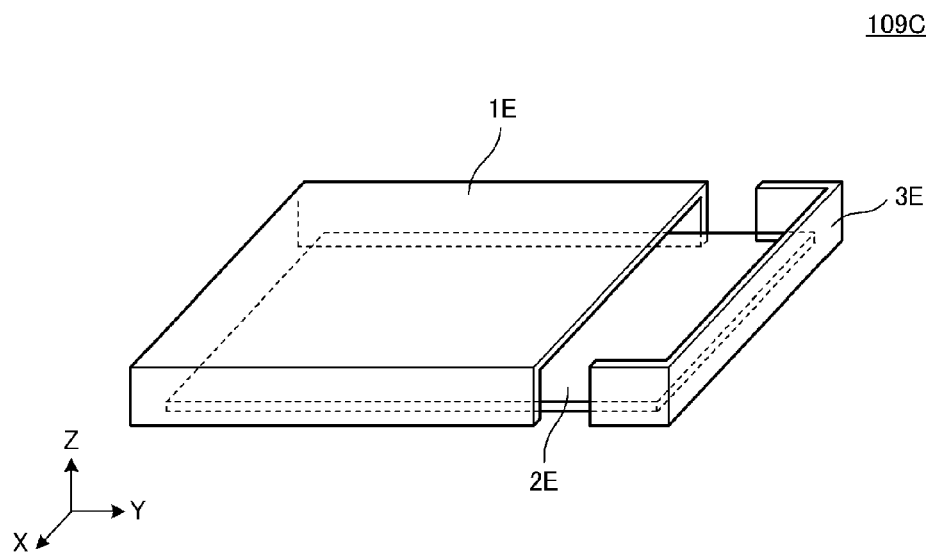
FIG. 23 is an external perspective view of a first conductive member, a second conductive member, and a third conductive member of an antenna device according to the ninth preferred embodiment of the present invention.
Figure 24:
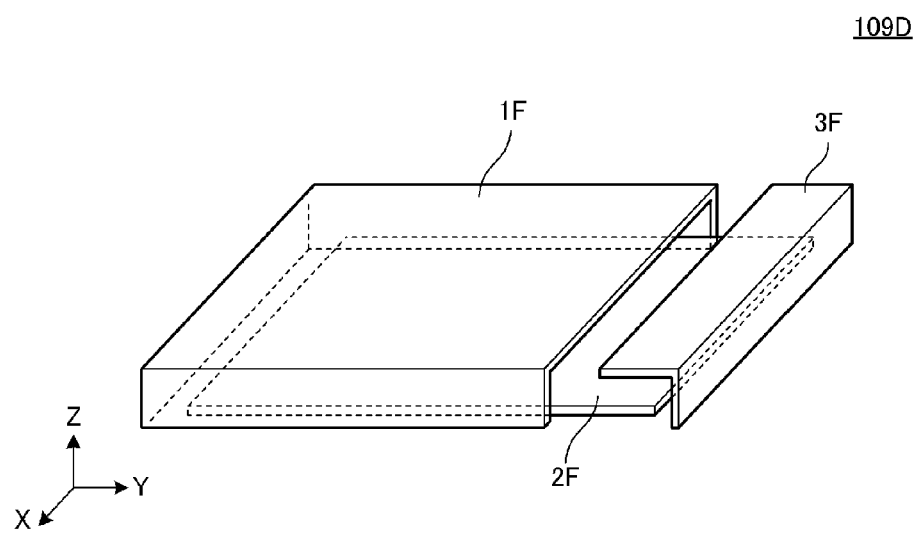
FIG. 24 is an external perspective view of a first conductive member, a second conductive member, and a third conductive member of an antenna device according to the ninth preferred embodiment of the present invention.
Figure 25:
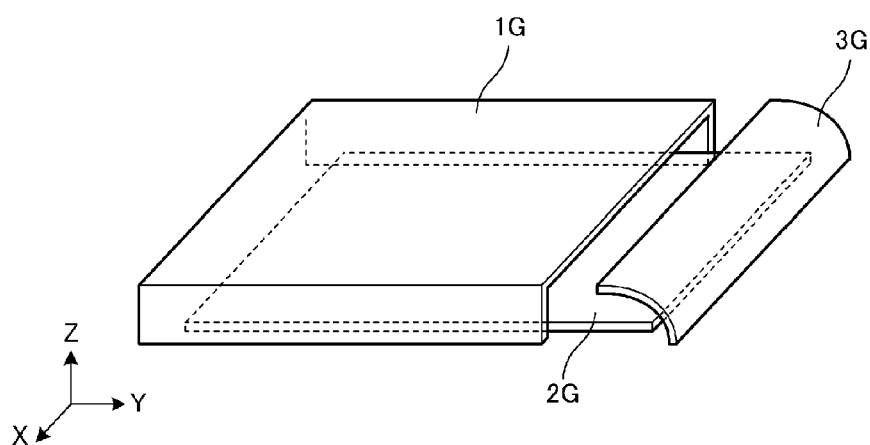
FIG. 25 is an external perspective view of a first conductive member, a second conductive member, and a third conductive member of an antenna device according to the ninth preferred embodiment of the present invention.

FIG. 21 is an external perspective view of a first conductive member 1C, a second conductive member 2C, and a third conductive member 3C of an antenna device 109A according to a ninth preferred embodiment of the present invention. FIG. 22 is an external perspective view of a first conductive member 1D, a second conductive member 2D, and a third conductive member 3D of an antenna device 109B according to the ninth preferred embodiment. FIG. 23 is an external perspective view of a first conductive member 1E, a second conductive member 2E, and a third conductive member 3E of an antenna device 109C according to the ninth preferred embodiment. FIG. 24 is an external perspective view of a first conductive member 1F, a second conductive member 2F, and a third conductive member 3F of an antenna device 109D according to the ninth preferred embodiment. FIG. 25 is an external perspective view of a first conductive member 1G, a second conductive member 2G, and a third conductive member 3G of an antenna device 109E according to the ninth preferred embodiment. In FIGS. 21, 22, 23, 24, and 25, the first connection, the power supply coil, the substrate, the battery pack, the first power supply circuit, the second power supply circuit, the reactance element, and the like are omitted for clarity.

The antenna devices 109A, 109B, 109C, 109D, and 109E are different from the antenna device 101 according to the first preferred embodiment in that the shapes of the first conductive member, the second conductive member, and the third conductive member are different. Furthermore, the antenna devices 109A, 109B, 109C, 109D, and 109E are different from the antenna device 101 in that the second conductive member, for example, is a portion of a housing of an electronic device, such as a smartphone. Other configurations of the antenna devices 109A, 109B, 109C, 109D, and 109E are the same or substantially the same as those of the antenna device 101 according to the first preferred embodiment.

The first conductive member 1C of the antenna device 109A is not a flat or substantially flat plate, and first conductive members 1C are also provided at the lateral sides at both ends of the conductive member 1C in the crosswise direction (the X-direction) and are coupled to the first conductive member 1C. As shown in FIG. 21, when viewed in the lengthwise direction (the Y-direction), the first conductive member 1C preferably is a U-shaped conductor, for example. Furthermore, the third conductive member 3C is not a flat or substantially flat plate, and third conductive members 3C are provided at both ends of the third conductive member 3C in the crosswise direction (the X-direction) and at a lateral side of a first end (the right side in FIG. 21) in the lengthwise direction (the Y-direction) and are coupled to the conductive member 3C. The second conductive member 2C is a rectangular flat or substantially rectangular flat plate.

The shape of the first conductive member 1D in the antenna device 109B is the same or substantially the same as that of the first conductive member 1C in the antenna device 109A. The third conductive member 3D is not a flat or substantially flat plate, and third conductive members 3D are also provided at both ends of the third conductive member 3D in the crosswise direction (the X-direction) and are coupled to the third conductive member 3D. As shown in FIG. 22, when viewed in the lengthwise direction (the Y-direction), the third conductive member 3D preferably is a U-shaped conductor, for example. The shape of the second conductive member 2D is the same or substantially the same as that of the second conductive member 2C in the antenna device 109A.

The shape of the first conductive member 1E in the antenna device 109C is the same or substantially the same as that of the first conductive member 1C in the antenna device 109A. The third conductive member 3E is not a flat or substantially flat plate, and third conductive members 3E are only provided at both ends of the third conductive member 3E in the crosswise direction (the X-direction) and at a lateral side of a first end (the right side in FIG. 23) in the lengthwise direction (the Y-direction) and are coupled to the conductive member 3E. As shown in FIG. 23, when viewed in the Z-direction, the third conductive member 3E preferably is a U-shaped conductor, for example. The shape of the second conductive member 2E is the same or substantially the same as that of the second conductive member 2C in the antenna device 109A.

The first conductive member 1F in the antenna device 109D is not a flat or substantially flat plate, and first conductive members 1F are provided at both ends of the first conductive member 1F in the crosswise direction (the X-direction) and at a lateral side of a second end (the left side in FIG. 24) in the lengthwise direction (the Y-direction) and are coupled to the conductive member 3C. The third conductive member 3F is not a flat or substantially flat plate, and a third conductive member 3F is provided at a lateral side of a first end (the right side in FIG. 24) of the third conductive member 3F in the lengthwise direction (the Y-direction) and are coupled to the third conductive member 3F. As shown in FIG. 24, when viewed in the crosswise direction (the X-direction), the third conductive member 3F preferably is an L-shaped conductor, for example. The shape of the second conductive member 2F is the same or substantially the same as that of the second conductive member 2C in the antenna device 109A.

The shape of the first conductive member 1G in the antenna device 109E is the same or substantially the same as that of the first conductive member 1C in the antenna device 109A. As shown in FIG. 25, the third conductive member 3G is, when viewed in the crosswise direction (the X-direction), a curved flat or substantially flat plate conductor drawing an arc. However, the third conductive member 3G is rectangular or substantially rectangular when viewed in the thickness direction (the Z-direction). The shape of the second conductive member 2G is the same or substantially the same as that of the second conductive member 2C in the antenna device 109A.

Even with the above configurations, the basic configurations of antenna devices 109A, 109B, 109C, 109D, and 109E are the same or substantially the same as that of the antenna device 101 according to the first preferred embodiment, and similar features and advantages as those of the antenna device 101 are provided.

In each of the antenna devices 109A, 109B, 109C, 109D, and 109E, since a portion of the housing is included as the second conductive member 2, a loop defining and functioning as a magnetic field antenna is able to be easily defined. Accordingly, since a conductor that defines a portion of the loop does not have to be formed separately, the electronic device itself is able to be made small in size, is able to be manufactured easily, and a cost thereof is able to be significantly reduced.

While the present preferred embodiment provides an example in which the first conductive member and the third conductive member are each a rectangular flat or substantially rectangular flat plate, the configuration of the present preferred embodiment is not limited to the above. The planar or substantially planar shapes of the first conductive member and the third conductive member may be appropriately changed to polygonal shapes, circular shapes, elliptical shapes, or the like within the range in which similar features and advantages as those of the antenna device 101 is able to be provided, for example. Furthermore, the three-dimensional structures, the thickness (the length in the Z-direction), and the like of the first conductive member and the third conductive member are able to be appropriately changed in the range in which the first conductive member and the third conductive member define a loop, and define and function as a booster antenna. Moreover, as described in the present preferred embodiment, the third conductive member is not limited to a flat or substantially flat plate and may have a curved surface shape, a linear shape, or the like.

While the present preferred embodiment provides an example in which the second conductive member is a rectangular flat or substantially rectangular flat plate, the configuration of the present preferred embodiment is not limited to the above. The planar or substantially planar shapes of the second conductive member may be appropriately changed to polygonal shapes, circular shapes, elliptical shapes, or the like within the range in which similar features and advantages as those of the antenna device 101 are able to be provided, for example. Furthermore, the three-dimensional structures, the thickness (the length in the Z-direction), and the like of the second conductive member may be appropriately changed within the range in which similar features and advantages as those of the antenna device 101 are able to be provided, for example.

Furthermore, in the present preferred embodiment, examples of antenna devices each in which a loop is defined by the first conductive member, the third conductive member, and the first connection have been provided; however, the antenna device may define a loop with the second conductive member, the third conductive member, and the second connection, for example. In the above case, the flat or substantially flat surface shape, the three-dimensional structures, the thickness (the length in the Z-direction), and the like of the second conductive member may be appropriately changed within the range in which similar features and advantages as those of the antenna device 102 according to the second preferred embodiment are able to be provided, for example.

Tenth Preferred Embodiment

Figure 26:
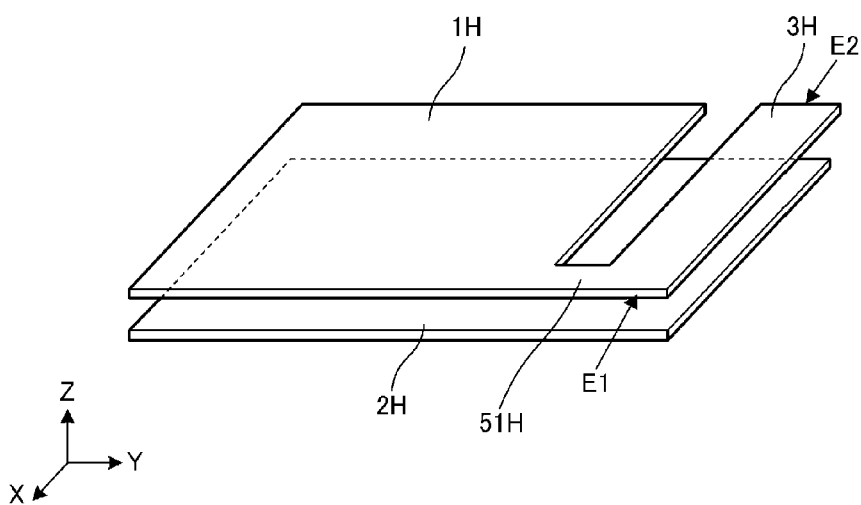
FIG. 26 is an external perspective view of a first conductive member, a second conductive member, a third conductive member, and a first connection of an antenna device according to a tenth preferred embodiment of the present invention.
Figure 27:
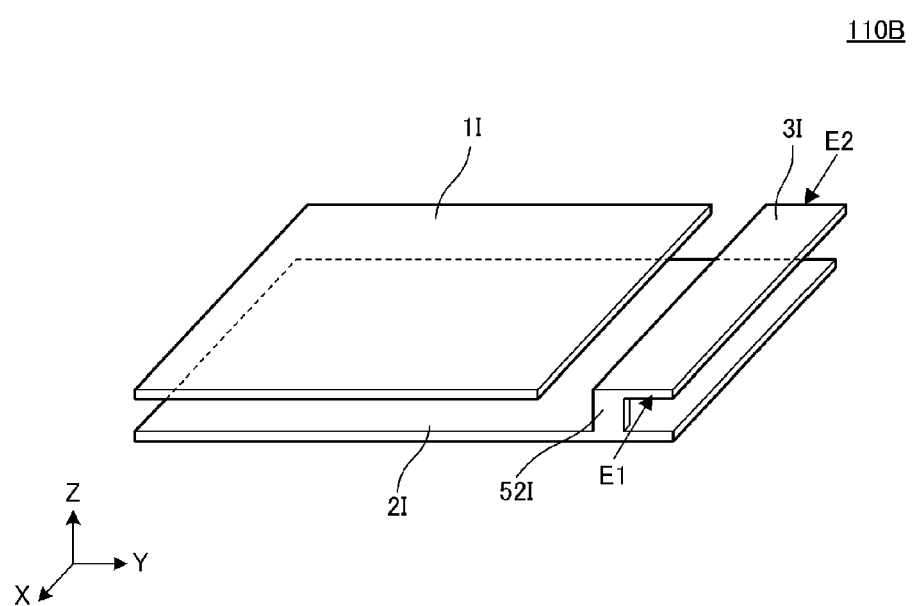
FIG. 27 is an external perspective view of a first conductive member 1I, a second conductive member 2I, a third conductive member 3I, and a second connection of an antenna device according to the tenth preferred embodiment of the present invention.

FIG. 26 is an external perspective view of a first conductive member 1H, a second conductive member 2H, a third conductive member 3H, and a first connection 51H of an antenna device 110A according to a tenth preferred embodiment of the present invention. FIG. 27 is an external perspective view of a first conductive member 1I, a second conductive member 2I, a third conductive member 3I, and a second connection 52I of an antenna device 110B according to the tenth preferred embodiment. In FIGS. 26 and 27, a second first connection, a second second connection, the power supply coil, the substrate, the battery pack, the first power supply circuit, the second power supply circuit, the reactance element, and the like are omitted for clarity.

The antenna device 110A according to the tenth preferred embodiment is different from the antenna device 101 according to the first preferred embodiment in that the first conductive member 1H, the third conductive member 3H, and the first first connection 51H are a portion of the housing. Furthermore, it is different from the antenna device 101 in that the second conductive member, for example, is a portion of a housing of an electronic device, such as a smartphone. Other configurations of the antenna device 110A are the same or substantially the same as those of the antenna device 101. In other words, the first conductive member 1H, the third conductive member 3H, and the first connection 51H are structured as a single member.

The antenna device 110B according to the tenth preferred embodiment is different from the antenna device 102 according to the second preferred embodiment in that the second conductive member 2I, the third conductive member 3I, and the first second connection 52I are a portion of the housing. Furthermore, it is different from the antenna device 102 in that the second conductive member, for example, is a portion of a housing of an electronic device, such as a smartphone. Other configurations of the antenna device 110B are the same or substantially the same as those of the antenna device 102. In other words, the second conductive member 2I, the third conductive member 3I, and the second connection 52I are structured as a single member.

The first conductive member 1H, the second conductive member 2H, and the third conductive member 3H of the antenna device 110A are rectangular flat or substantially rectangular flat plates. The first end portion E1 of the third conductive member 3H is coupled to the first conductive member 1H with the first connection 51H interposed therebetween. The first connection 51H according to the present preferred embodiment is, similar to the first conductive member 1H and the third conductive member 3H, a portion of the housing, and is structured as a single (an integral) member.

The second end portion E2 of the third conductive member 3H is coupled to the first conductive member 1H with the second first connection (not shown) interposed therebetween. Accordingly, the first conductive member 1H, the third conductive member 3H, the first connection 51H, and the second first connection define a loop.

The first conductive member 1I, the second conductive member 2I, and the third conductive member 3I of the antenna device 110B are rectangular flat or substantially rectangular flat plates. The first end portion E1 of the third conductive member 3I is coupled to the second conductive member 2I with the second connection 52I interposed therebetween. The second connection 52I according to the present preferred embodiment is, similar to the second conductive member 2I and the third conductive member 3I, a portion of the housing, and is structured as a single (an integral) member.

The second end portion E2 of the third conductive member 3I is coupled to the second conductive member 2H with the second second connection (not shown) interposed therebetween. Accordingly, the first conductive member 1I, the third conductive member 3I, the second connection 52I, and the second second connection define a loop.

Even with the above configuration, the basic configuration of the antenna device 110A is the same or substantially the same as that of the antenna device 101 according to the first preferred embodiment, and similar features and advantages as those of the antenna device 101 are provided. Furthermore, the basic configuration of the antenna device 110B is the same or substantially the same as that of the antenna device 102 according to the second preferred embodiment, and similar features and advantages as those of the antenna device 102 are provided.

In the antenna device 110A, since a portion of the housing is included as the first connection 51H, a loop defining and functioning as a magnetic field antenna is able to be easily defined. Accordingly, since a conductor that defines a portion of the loop does not have to be formed separately, the electronic device itself is able to be made small in size, is able to be manufactured easily, and a cost thereof is able to be significantly reduced. In the antenna device 110A, while only the first first connection 51H uses a portion of the housing, the configuration of the antenna device 110A is not limited to the above configuration. The second first connection may also use a portion of the housing. In other words, the entire loop may be defined by the housing, for example.

In the antenna device 110B, since a portion of the housing is included as the second connection 52I, a loop defining and functioning as a magnetic field antenna is able to be easily provided. Accordingly, since a conductor that defines a portion of the loop does not have to be formed separately, the electronic device itself is able to be made small in size, is able to be manufactured easily, and a cost thereof is able to be significantly reduced. In the antenna device 110B, while only the first second connection 52I preferably uses a portion of the housing, the configuration of the antenna device 110B is not limited to the above configuration. The second second connection may also use a portion of the housing. In other words, the entire loop may be defined by the housing, for example.

Other Preferred Embodiments

In the preferred embodiments described above, the antenna devices and the electronic devices in communication systems, for example, an NFC, with magnetic field coupling have been described. However, the antenna devices and the electronic devices in the preferred embodiments described above are able to be similarly included in a contactless power transmission system (an electromagnetic induction system, a magnetic field resonance system) with magnetic field coupling. For example, the antenna devices of the preferred embodiments described above are able to be applied as a power reception antenna device of a power reception device or a power transmission antenna device of a power transmission device in a contactless power transmission system of a magnetic field resonance system that is included in a frequency in the HF band (particularly, about 6.78 MHz), for example. In the above case, the antenna device defines and functions as the power transmission antenna device or the power reception antenna device. Both ends of the coil-shaped conductor included in the power supply coil of the antenna device are coupled to a power reception circuit or a power transmission circuit that controls the frequency band (the HF band, about 6.78 MHz in particular). The power reception circuit includes, for example, a matching circuit, a smoothing circuit, a DC/DC converter, and the like to feed electric power from the power reception antenna to a load (a secondary battery, or the like). The power reception circuit is cascade-connected between the power reception antenna and the load. Furthermore, the power transmission circuit includes a rectifier circuit, a smoothing circuit, a switching circuit that defines and functions as a DC/AC inverter, and the like to supply electric power from, for example, a commercial power supply to the power transmission antenna. The power transmission circuit is cascade-connected between the commercial power supply and the power transmission antenna.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
    a power supply coil including a coil-shaped conductor, the power supply coil being coupled to a first power supply circuit that operates in a first frequency band;
    a first conductive member including a first main surface;
    a second conductive member that has an area that is smaller than an area of the first conductive member when viewed in a direction perpendicular or substantially perpendicular to the first main surface; and
    a plurality of connections that couple the first conductive member and the second conductive member to each other; wherein
    the first conductive member and the second conductive member do not overlap each other when viewed in the direction perpendicular or substantially perpendicular to the first main surface;
    the first conductive member, the second conductive member, and the plurality of connections define at least a portion of a loop of a magnetic field antenna in the first frequency band; and
    the power supply coil is disposed closer to the second conductive member than to the first conductive member.

2. The antenna device according to claim 1, wherein the plurality of connections include at least one reactance element.

3. The antenna device according to claim 1, wherein an entirety of the power supply coil overlaps the second conductive member when viewed in the direction perpendicular or substantially perpendicular to the first main surface.

4. The antenna device according to claim 1, wherein the power supply coil does not overlap the first conductive member when viewed in the direction perpendicular or substantially perpendicular to the first main surface.

5. The antenna device according to claim 1, wherein the second conductive member is coupled to a second power supply circuit that operates in a second frequency band higher than the first frequency band, the second conductive member being a radiation element of a standing wave antenna in the second frequency band.

6. The antenna device according to claim 1, wherein the first conductive member is a ground conductor.

7. An electronic device comprising:
    an antenna device; and
    a housing; wherein
    the antenna device includes:
        a power supply coil including a coil-shaped conductor, the power supply coil being coupled to a power supply circuit that operates in a first frequency band;
        a first conductive member including a first main surface;
        a second conductive member that has an area that is smaller than an area of the first conductive member when viewed in a direction perpendicular or substantially perpendicular to the first main surface; and
        a plurality of connections that couple the first conductive member and the second conductive member to each other; wherein
    the first conductive member and the second conductive member do not overlap each other when viewed in the direction perpendicular or substantially perpendicular to the first main surface;
    the first conductive member, the second conductive member, and the plurality of connections define at least a portion of a loop of a magnetic field antenna in the first frequency band; and
    the power supply coil is disposed closer to the second conductive member than to the first conductive member.

8. The electronic device according to claim 7, wherein at least one of the plurality of connections is a portion of the housing.

9. The electronic device according to claim 7, wherein the first conductive member is a portion of the housing.

10. The electronic device according to claim 7, wherein the second conductive member is a portion of the housing.

* * * * *